United States Patent
Tsubamoto

(10) Patent No.: US 7,805,267 B2
(45) Date of Patent: Sep. 28, 2010

(54) APPARATUS, METHOD AND PROGRAM FOR VERIFICATION OF TRANSMISSION MARGIN

(75) Inventor: Daita Tsubamoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1632 days.

(21) Appl. No.: 11/006,770

(22) Filed: Dec. 8, 2004

(65) Prior Publication Data

US 2006/0062234 A1    Mar. 23, 2006

(30) Foreign Application Priority Data

Sep. 22, 2004    (JP) ............................. 2004-275098

(51) Int. Cl.
*H04L 12/56* (2006.01)

(52) U.S. Cl. ............................. 702/69; 702/70; 702/71; 702/72; 702/73; 702/74; 370/419; 327/520; 327/527; 327/532

(58) Field of Classification Search ............. 702/69–74; 370/419; 324/520, 527, 532

See application file for complete search history.

(56) References Cited

U.S. PATENT DOCUMENTS 6,177,801 B1 * 1/2001 Chong ........................ 324/520
6,342,823 B1 * 1/2002 Dansky et al. ................. 333/1

FOREIGN PATENT DOCUMENTS

| JP | 5-276039 | 10/1993 |
| JP | 11-232314 | 8/1999 |
| JP | 2002-245107 | 8/2002 |

\* cited by examiner

*Primary Examiner*—Sujoy K Kundu
(74) *Attorney, Agent, or Firm*—Fujitsu Patent Center

(57) ABSTRACT

The present invention relates to verification of a transmission margin of various transmission lines transmitting a signal such as a high-speed digital signal and ensures improved verification accuracy. A transmission margin verification apparatus according to the present invention is configured with a measurement unit (e.g., LSI tester 4, network analyzer 6, pulse generator 8, oscilloscope 10) operable to measure a transmission loss and a leading edge waveform of pseudo transmission lines (e.g., transmission lines 56, 62, 66) corresponding to a target device 44 to be verified, and a calculation unit (tester controller 12) operable to reference the transmission line loss and the leading edge waveform measured by the measurement unit, calculate a transmission waveform of the target device, and associate the transmission waveform with a mask of the target device to calculate a transmission margin of the target device.

19 Claims, 27 Drawing Sheets

APPARATUS, METHOD AND PROGRAM FOR VERIFICATION OF TRANSMISSION MARGIN

BACKGROUND OF THE INVENTION

1. Field of the Invention

The present invention relates generally to automatic verification of transmission margins of various types of transmission lines transmitting signals such as high-speed digital signals, and more particularly, to a transmission margin verification apparatus, method and program using a combination of existing measuring devices to effect the automatic verification.

2. Description of the Related Art

The transmission speed of a digital signal in digital electronic equipment is becoming faster in recent years against the backdrop of the increased amount of information processed that is demanded of such equipment. This is the reason why the verification of a transmission margin is required in transmission lines transmitting high-speed digital signals.

While the transmission margin verification in a transmission line has been conducted through theoretical calculations based on the specification of each of the components in the transmission line and the general transmission engineering theories, the verification results thereof have fallen short of constituting grounds to guarantee the product performance because of many errors.

Patent documents are available in relation to such transmission lines and transmission margins thereof, namely, Japanese Patent Application Laid-Open Publication Nos. 1993-276039, 1999-232314 and 2002-245107. Japanese Patent Application Laid-Open Publication No. 1993-276039 does little more than disclose an anti-malfunction A/D conversion apparatus with a shorter conversion time to solve the problem that if the A/D conversion starts with an external trigger from an external trigger input terminal that is also used as an analog input terminal, those signals input as external trigger signals rather than as analog signals are also subjected to an A/D conversion, that this conversion creates a one-channel time loss until the A/D conversion is complete, and that this gives rise to a one-channel delay in the generation of an interrupt signal.

Japanese Patent Application Laid-Open Publication No. 1999-232314 discloses, as a high-frequency circuit design support apparatus, a configuration having a correction data generation unit and operable to convert coordinate variations of the parts in the state diagram in the state diagram display unit to parameter variations of the symbols in the corresponding circuit diagram.

On the other hand, Japanese Patent Application Laid-Open Publication No. 2002-245107 relates to high-frequency circuit design and high-frequency measurement and discloses the determination of parameters in an impedance matching circuit provided at the input and output ends of a high-frequency semiconductor device.

Incidentally, a transmission margin of a transmission line is unacceptable as grounds to guarantee the product performance if the verification of the margin is not appropriate. Such a problem is not disclosed at all in Japanese Patent Application Laid-Open Publication Nos. 1993-276039, 1999-232314 and 2002-245107, and the technology to solve the problem is neither disclosed nor suggested.

SUMMARY OF THE INVENTION

The present invention is directed to verification of transmission margins of transmission lines used to transmit signals such as high-speed digital signals, and it is an object of the present invention to improve the verification accuracy.

It is another object of the present invention to improve the verification accuracy by actual measurement, simplify the measurement process or reduce the number of measurement process steps, and realize the automatic verification.

In order to achieve the above objects, according to an aspect of the present invention there is provided a transmission margin verification apparatus, comprising a measurement unit configured to measure a transmission line loss and a leading edge waveform of pseudo transmission lines corresponding to a target device to be verified; and a calculation unit configured to reference the transmission line loss and the leading edge waveform measured by the measurement unit, the calculation unit calculating a transmission waveform of the target device and associating the transmission waveform with a mask of the target device to calculate a transmission margin of the target device. The transmission margin verification apparatus has a single or a plurality of pseudo transmission lines to suit the target device to be verified and measures the transmission line loss and the leading edge waveform of the pseudo transmission lines with a measurement unit. The calculation unit references the transmission line loss and the leading edge waveform measured by the measurement unit, calculates the transmission waveform of the target device and associates the transmission waveform with a mask of the target device to calculate the transmission margin of the target device.

To attain the above objects, the measurement unit may be arranged to measure the transmission line loss and the leading edge waveform of the pseudo transmission lines calculated with a simulator. That is, actual measurement data need not always be used as measurement data of the transmission line loss and the leading edge waveform of the pseudo transmission lines. Therefore, the transmission line loss and the leading edge waveform of the pseudo transmission lines are calculated with a simulator. In this case, the pseudo transmission lines may be estimated through simulation as well.

To attain the above objects, the measurement unit may be arranged to cooperate with a simulator to acquire a leading edge waveform of a pre-emphasized transmission waveform or of a transmission waveform containing multi-level codes. That is, if a complex transmission waveform such as a pre-emphasized waveform or a waveform containing multi-level codes is used as a transmission waveform to acquire a leading edge waveform for that transmission waveform, this contributes to improved verification accuracy of the target device's transmission margin. Here, the term "complex transmission waveform such as a pre-emphasized waveform or a waveform containing multi-level codes" refers to the waveform in complex form of a signal processed to strengthen a certain frequency component of the signal relative to other components to improve the SN ratio and reduce the distortion or of a signal representing codes of values other than "0" and "1" (multi-level codes).

To attain the above objects, the measurement unit may be arranged to measure the crosstalk of a plurality of transmission systems included in the target device.

In order to achieve the above objects, according to another aspect of the present invention there is provided a transmission margin verification method, comprising acquiring a transmission line loss and a leading edge waveform of pseudo transmission lines corresponding to a target device to be verified; referencing the transmission line loss and the leading edge waveform to calculate a transmission waveform of the target device; and associating the transmission waveform with a mask of the target device to calculate a transmission margin of the target device.

In this transmission margin verification method, a single or a plurality of pseudo transmission lines are made available to suit the target device to be verified and measure the transmission line loss and the leading edge waveform of the pseudo transmission lines. Following this process, the transmission line loss and the leading edge waveform are referenced to calculate the transmission waveform of the target device. Then, the measured transmission waveform is associated with a mask of the target device to calculate the transmission margin of the target device. This simplifies the measurement process or reduces the number of measurement process steps, allows the automatic verification and ensures improved verification accuracy of the target device's transmission margin.

To attain the above object, the transmission margin verification method may further comprise measuring noises of a measuring device at a flat portion of a repetitive pattern with a long period, wherein the transmission margin is calculated by use of an eye pattern obtained by removing the measuring device noises. The method may further comprise measuring a jitter in a repetitive waveform; and removing the jitter in the repetitive waveform from a jitter in a random pattern to obtain a transmission line jitter. The method may further comprise finding shortest and longest periods of a signal protocol applied to the target device; acquiring leading edge waveforms of repetitive signals with the longest and shortest periods; and calculating as a transmission line jitter the difference between the leading edge waveform of the repetitive signal with the shortest period and the leading edge waveform of the repetitive signal with the longest period. The method may further comprise varying a termination resistance at the measuring device to measure a mismatch at the receiving end. The method may further comprise acquiring leading edges of transmission waveforms with the shortest and longest periods of the protocol applied to the target device; and verifying the worst case from the leading edges of the transmission waveforms.

In order to achieve the above object, according to a further aspect of the present invention there is provided a transmission margin verification program operable to drive a computer to execute the steps of acquiring data representative of a transmission line loss and a leading edge waveform of pseudo transmission lines corresponding to a target device to be verified; referencing the transmission line loss and the leading edge waveform to calculate a transmission waveform of the target device; and associating the transmission waveform with a mask of the target device to calculate a transmission margin of the target device. Running the verification program having such steps in a computer allows the realization of the aforementioned transmission margin verification method through computer processing, thus enabling the automatic verification of the transmission margin.

To attain the above object, transmission margin verification program may further comprise the steps of obtaining noises of a measuring device at a flat portion of a repetitive pattern with a long period; and calculating the transmission margin by use of an eye pattern obtained by removing the measuring device noises. The program may further comprise the steps of obtaining a jitter in a repetitive waveform; and removing the jitter in the repetitive waveform from a jitter in a random pattern to obtain a transmission line jitter. The program may further comprise the steps of finding shortest and longest periods of a signal protocol applied to the target device; acquiring data representative of leading edge waveforms of repetitive signals with the longest and shortest periods; and calculating as a transmission line jitter the difference between the leading edge waveform of the repetitive signal with the shortest period and the leading edge waveform of the repetitive signal with the longest period. The program may further comprise the step of varying a termination resistance at the measuring device to measure a mismatch at the receiving end. The program may further comprise the steps of acquiring data representative of leading edges of transmission waveforms with the shortest and longest periods of the protocol applied to the target device; and verifying the worst case from the leading edges of the transmission waveforms.

As described above, the transmission margin verification apparatus, verification method and verification program according to the present invention can advantageously improve the verification accuracy of the transmission margin of transmission lines used to transmit a signal such as a high-speed digital signal, simplify the measurement process or reduce the number of measurement process steps and realize the automatic verification of the transmission margin covering various items.

The features and advantages of the present invention are as follows.

(1) Improves the verification accuracy in the verification of the transmission margin of transmission lines used to transmit a signal such as a high-speed digital signal (2) Simplifies the verification process or reduces the number of verification process steps and establishes the automatic verification of the transmission margin covering various items

BRIEF DESCRIPTION OF THE DRAWINGS

The above and other objects, aspects, features and advantages of the present invention will become more apparent from the following detailed description of the embodiments when taken in conjunction with the accompanying drawings, in which.

DETAILED DESCRIPTION OF THE PREFERRED EMBODIMENTS

First Embodiment

Figure 1:
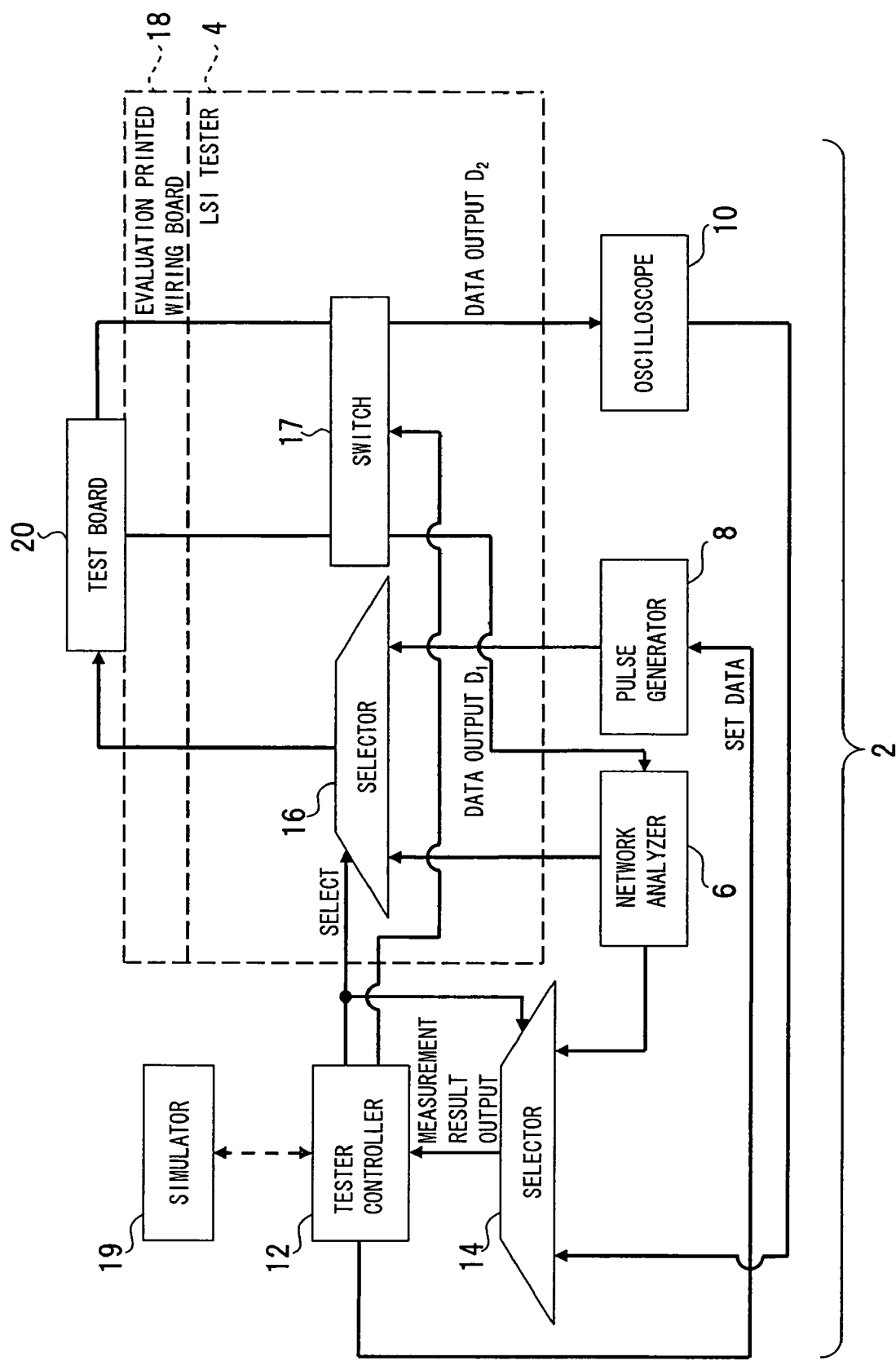
FIG. 1 shows a transmission margin verification apparatus according to a first embodiment of the present invention.

A first embodiment of the present invention will be described with reference to FIG. 1. FIG. 1 shows a transmission margin verification apparatus according to this embodiment.

A transmission margin verification apparatus 2 is provided with an LSI (Large Scale Integration) tester 4, a network analyzer 6, a pulse generator 8, an oscilloscope 10 and the like as a plurality of measuring devices as an example of a measurement unit and also provided with a tester controller 12. In this embodiment, the network analyzer 6, the pulse generator 8 and the oscilloscope 10 are used in combination with the LSI tester 4 as a plurality of individual measuring devices. On the other hand, the tester controller 12 is an example of a function control unit of various measuring devices as with a measurement data arithmetic processing unit. That is, the tester controller 12 selects and/or controls the functions of each of the measuring devices to implement the automatic measurement/verification functions.

Configured with a computer and the like, the tester controller 12 runs measurement, verification and other programs stored in a ROM (Read-Only Memory) to select selectors 14 and 16 and a switch 17, set data and execute arithmetic operations. The network analyzer 6 receives a data output D1 of a test board 20 placed, as a target to be measured, on an evaluation printed wiring board 18 of the LSI tester 4 to measure a loss, and this output measured by the network analyzer 6 is imparted to the selectors 14 and 16. The test board 20 is, for example, a transmission line whose transmission margin is to be measured. The pulse generator 8 prepares data based on the data set by the tester controller 12, and the output of the pulse generator 8 is imparted to the selector 16. The oscilloscope 10 receives a data output D2 from the test board 20 to display the output waveform, and this measurement output is imparted to the selector 14. To the selector 14, not only the outputs of the network analyzer 6 and the oscilloscope 10 but also the control output from the tester controller 12 are imparted, and the measurement result output selected by the selector 14 is imparted to the tester controller 12. The tester controller 12 receives the aforementioned output selected by the selector 14 to set data in the pulse generator 8 and generate a selection control signal to the selector 16.

To the test board 20, the output of the network analyzer 6 or the pulse generator 8 is imparted by the selection of the selector 16, as a result of which the data outputs D1 and D2 are obtained. This allows the waveform to be observed on the oscilloscope 10 and the loss to be measured by the network analyzer 6.

In this embodiment, a simulator 19 may be connected as an external device to the tester controller 12 to load data comparable to actual measurement data from the simulator 19.

Figure 2:
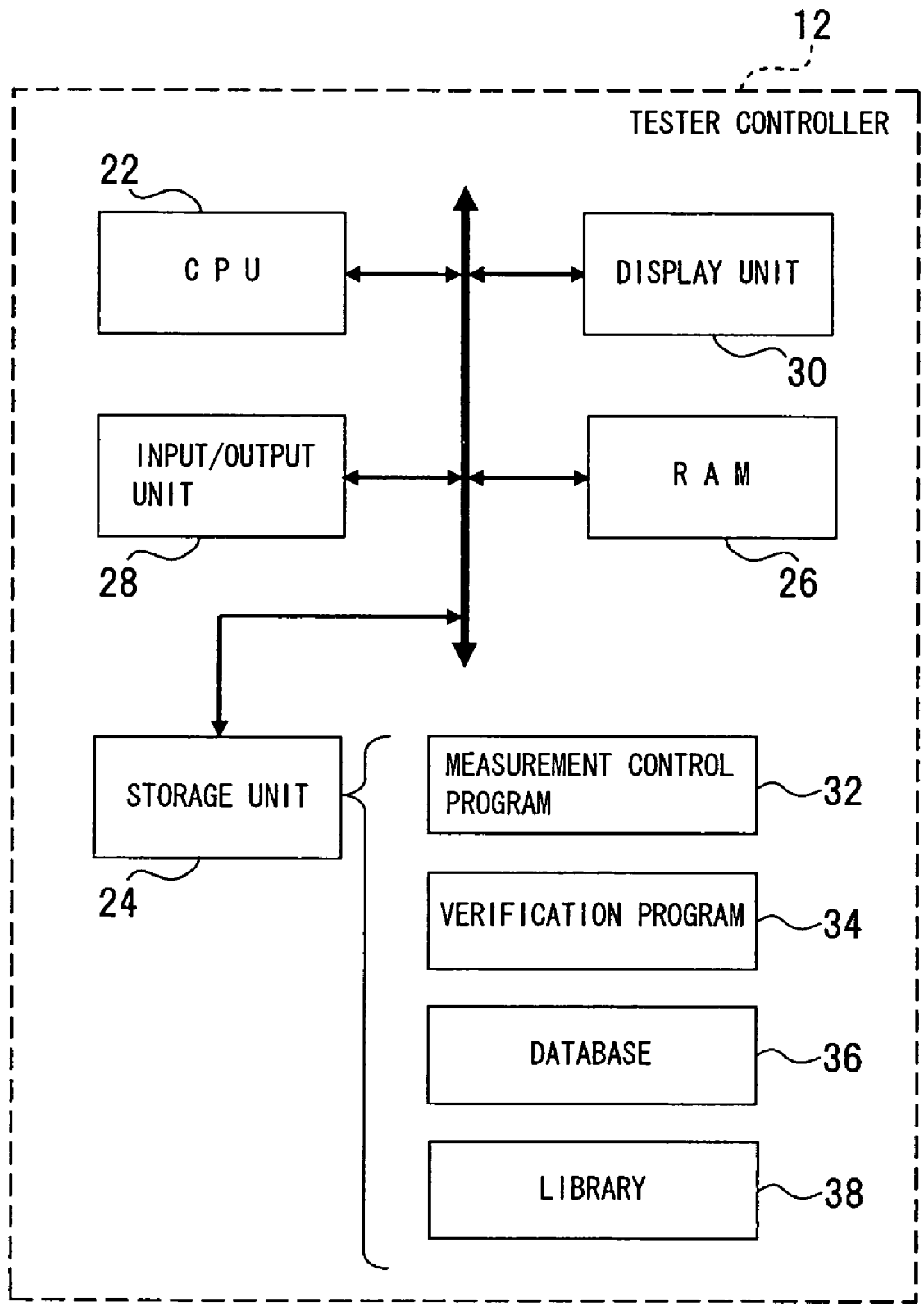
FIG. 2 is a block diagram showing a configuration example of a tester controller.

Next, the tester controller will be described with reference to FIG. 2. FIG. 2 shows a configuration example of the tester controller.

The tester controller 12 is configured, for example, with a personal computer and provided with a CPU (Central Processing Unit) 22, a storage unit 24, a RAM (Random-Access Memory) 26, an input/output unit 28, a display unit 30 and the like. The CPU 22 runs various programs stored in the storage unit 24 and executes the processes including handling various measurement control tasks, calculating measured values and performing the verification. The storage unit 24 is provided, for example, with a ROM. The ROM stores a measurement control program 32 and a verification program 34. The storage unit 24 is also provided with a database 36 and a library 38 storing various data such as measurement data and specifications. The RAM 26 stores measurement data and data in the process of arithmetic operation. The input/output unit 28 is responsible for inputting/outputting various data. For instance, the input/output unit 28 is responsible for inputting various specification values from a keyboard and data from a CD-ROM and also for outputting data. This data output includes writing to the CD-ROM. The display unit 30 is configured with an LCD (Liquid Crystal Display) or other display and presents data in the form of images.

Figure 3:
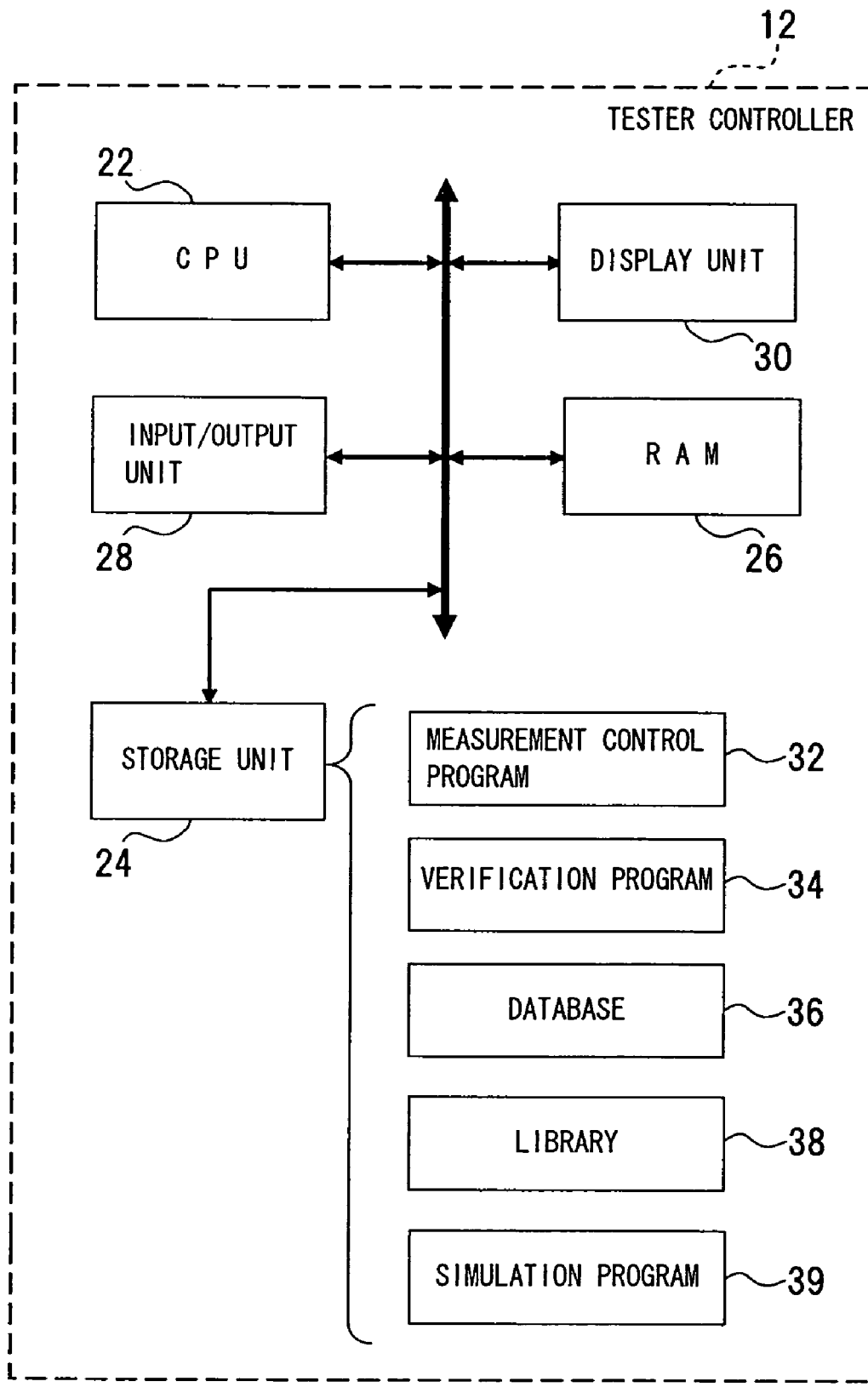
FIG. 3 is a block diagram showing another configuration example of a tester controller.

Using the tester controller 12 having such a configuration allows quickly and readily executing tasks such as the selection of various measuring devices provided in the transmission margin verification apparatus 2 (FIG. 1), the selection of functions of each of the measuring devices and various processings on the measurement data. It is to be noted that a simulation program 39 may be, for example, stored in the storage unit 24 as shown in FIG. 3 to configure the tester controller 12 as a simulator.

Figure 4:
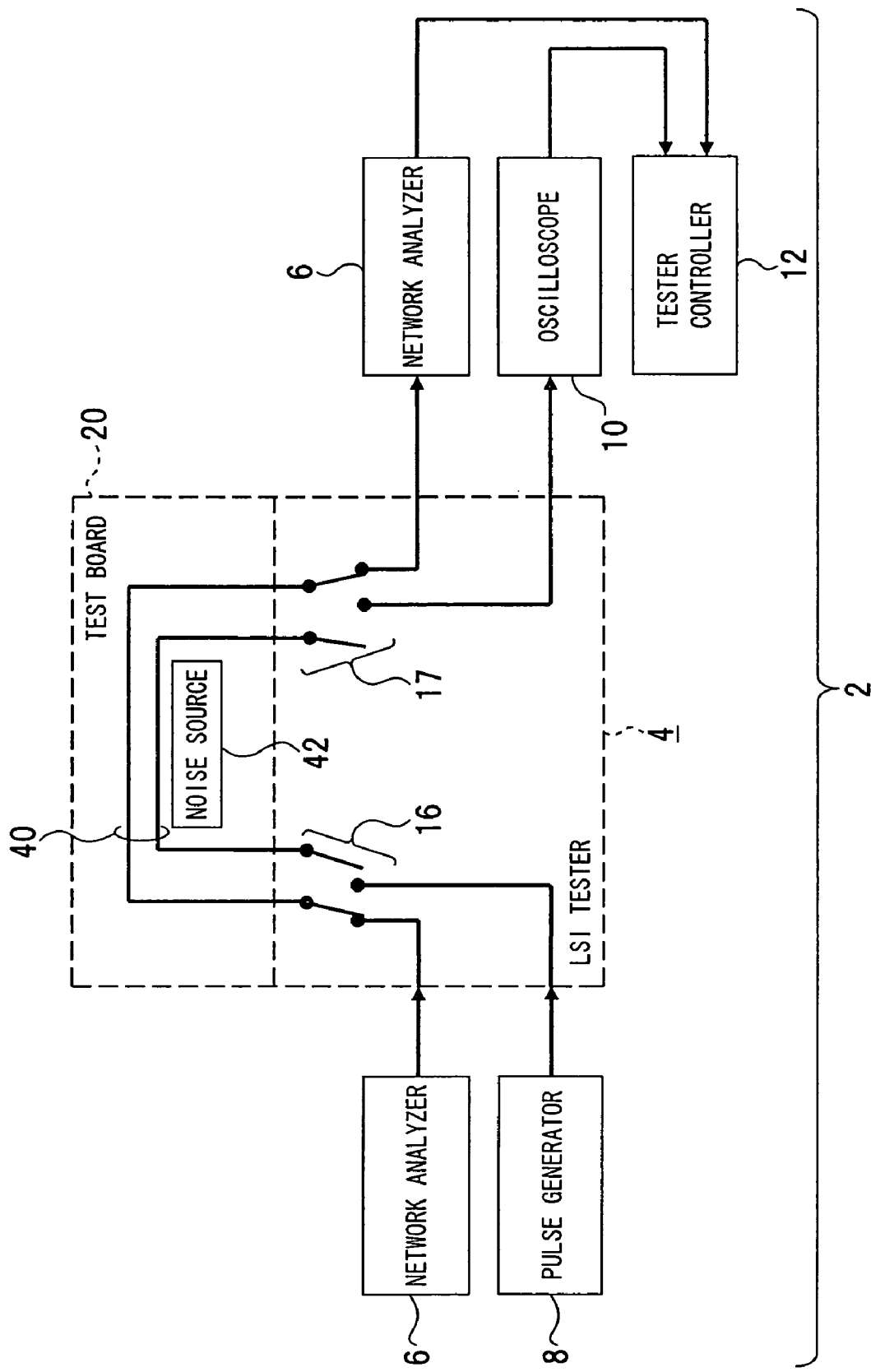
FIG. 4 is a block diagram showing a configuration example of a transmission system and measuring devices.

Description will be given next of the transmission margin verification in a transmission system using the test board with reference to FIG. 4. FIG. 4 shows a configuration example of a transmission system and measuring devices provided on the test board. The same reference numerals are used for the same components as those in FIG. 1.

The LSI tester 4 controls relays provided on the test board 20 to change connections between the network analyzers 6, the pulse generator 8 and the oscilloscope 10 as external measuring devices and the test board 20. The measuring devices connected to the test board 20 such as the network analyzer 6 and the oscilloscope 10 are controlled by the tester controller 12 to make measurements. The measurement results thereof are loaded into the tester controller 12. This makes it possible to measure the loss in a transmission line 40, i.e., the system to be measured, and the noise to the transmission line 40 from a noise source 42.

Figure 5:
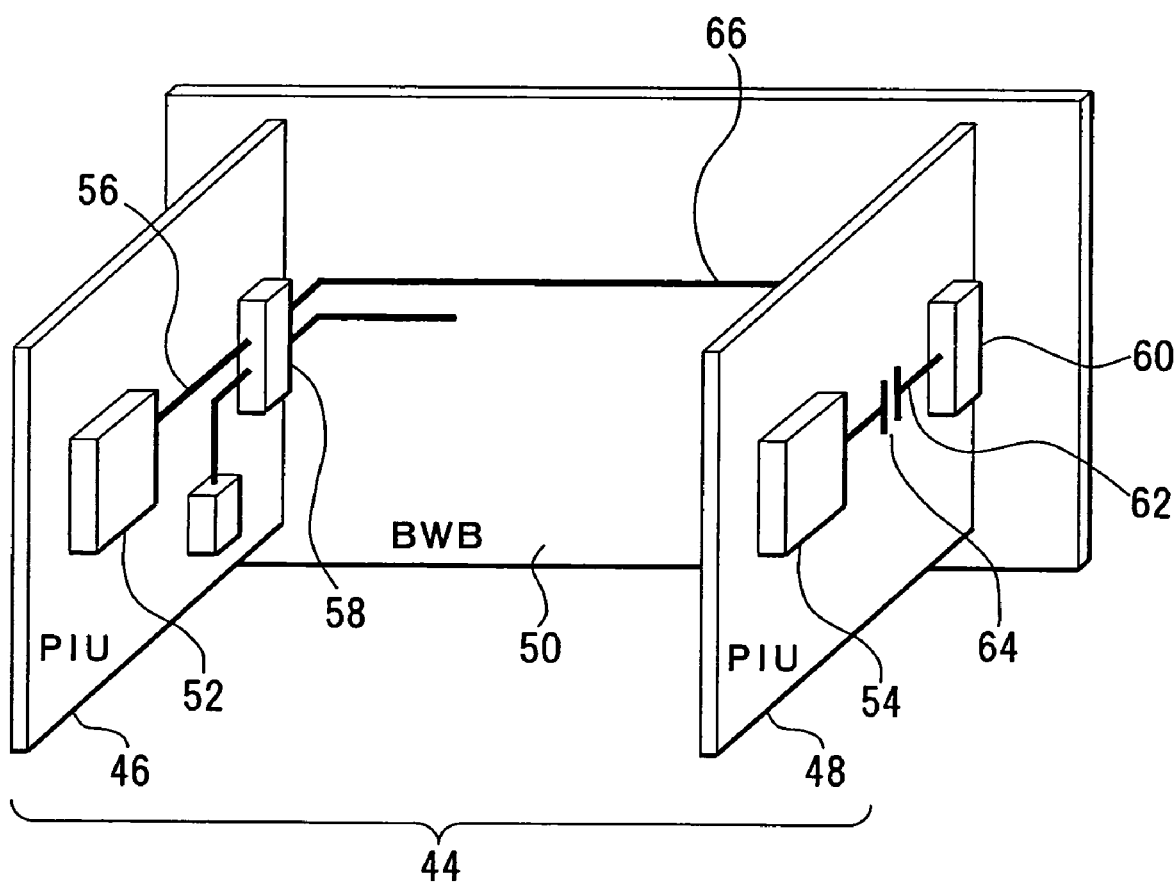
FIG. 5 shows an example of a target device.
Figure 6:
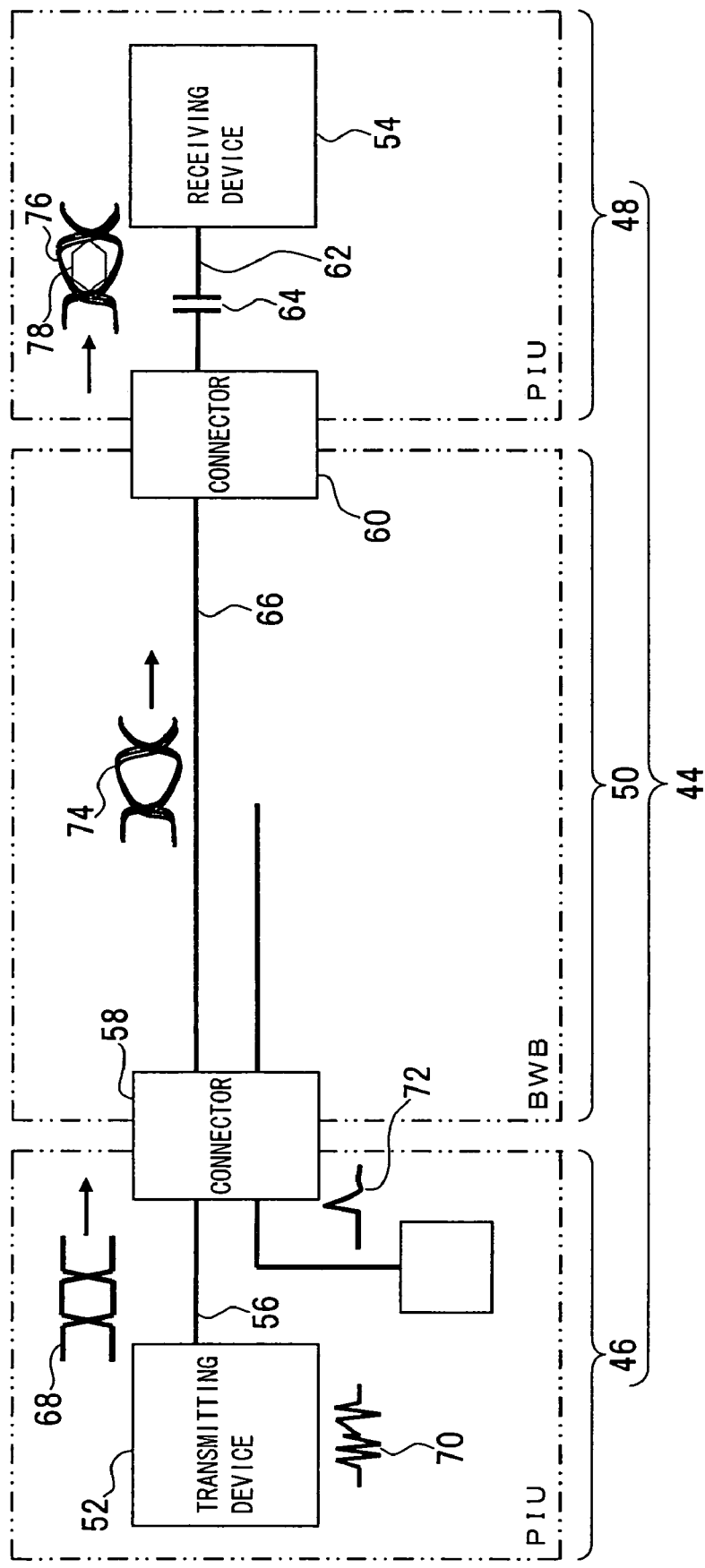
FIG. 6 shows a configuration example of the target device.

Description will be given next of a target device used in the verification of the transmission margin with reference to FIGS. 5 and 6. FIG. 5 shows an example of the target device whose transmission margin is verified by the transmission margin verification apparatus, whereas FIG. 6 shows a configuration of the target device.

A target device 44 is provided with printed wiring boards (hereinafter referred to as "PT boards") 46 and 48 as PIUs (Plug in Units) and a PT board 50 as a BWB (Back Wiring Board). The PT board 46 is provided with a transmitting device 52, whereas the PT board 48 is provided with a receiving device 54. To connect the transmitting and receiving devices 52 and 54, the PT board 46 is provided with a transmission line 56 and a BWB connector (hereinafter simply referred to as "connector") 58, and the PT board 48 is provided with a connector 60, a transmission line 62 and a coupling capacitor 64. The PT board 50 is provided with a transmission line 66. The connector 58 mediates between the transmission line 56 on the side of the PT board 46 and the transmission line 66 on the side of the PT board 50 to couple the two transmission lines. On the other hand, the connector 60 mediates between the transmission line 62 on the side of the PT board 48 and the transmission line 66 on the side of the PT board 50 to couple the two transmission lines. While the coupling capacitor 64 is provided in this embodiment, the target device 44 without the coupling capacitor 64 may also be used.

In the target device 44 as described above, the output waveform on the side of the transmitting device 52 (transmission waveform 68) involves an output amplitude, waveform rise time/fall time (Tr/Tf) and an output jitter, whereas the receiving device 54 involves a waveform mask specification. Losses, on the other hand, occur at the PT board 50, the connectors 58 and 60 and the coupling capacitor 64, and as a result of matching at the receiving end. In this case, the transmission waveform transmitted from the transmitting device 52 to the receiving device 54 through the transmission lines 56, 66 and 62 is a high-speed digital signal. The signal may be a binary signal or a complex signal such as a signal containing codes that represent values other than "0" and "1" (multi-level codes) or a pre-emphasized signal. A pre-emphasized transmission waveform is a signal that is processed to strengthen a certain frequency component of the signal relative to other components to improve the SN ratio and reduce the distortion at the time of signal transmission. In the case of data transmission over the voice band, on the other hand, the transmission waveform includes a multi-valued signal. The multi-valued signal is a signal whose phase or amplitude is divided into a number of levels, with one of groups of input data bits associated with one of the levels. On the other hand, multi-level codes include a code made up of one byte and a code such as 2BIQ that is a quaternary code converted from two binary codes before transmission (block code).

Each of the transmission lines 56, 62 and 66 involves a transmission line length and a transmission line loss. As for noise, three types of noise exist, i.e., connector stroke, PT board stroke and power supply noise. The PT boards 46, 48 and 50 cause a jitter. As an illustration thereof, amplitude and jitter occur in the transmission waveform 68 of the transmitting device 52, and noise 70 occurs in the transmitting device 52 as shown in FIG. 6. Noise 72 occurs in the connector 58, and jitter occurs in a transmission waveform 74 of the transmission line 66. On the other hand, the receiving device 54 involves a waveform mask 78 for a reception waveform 76. The waveform mask 78 represents a waveform amplitude that cannot be received by the receiving device 54, and the reception waveform 76 beyond this level is received by the receiving device 54.

Figure 7:
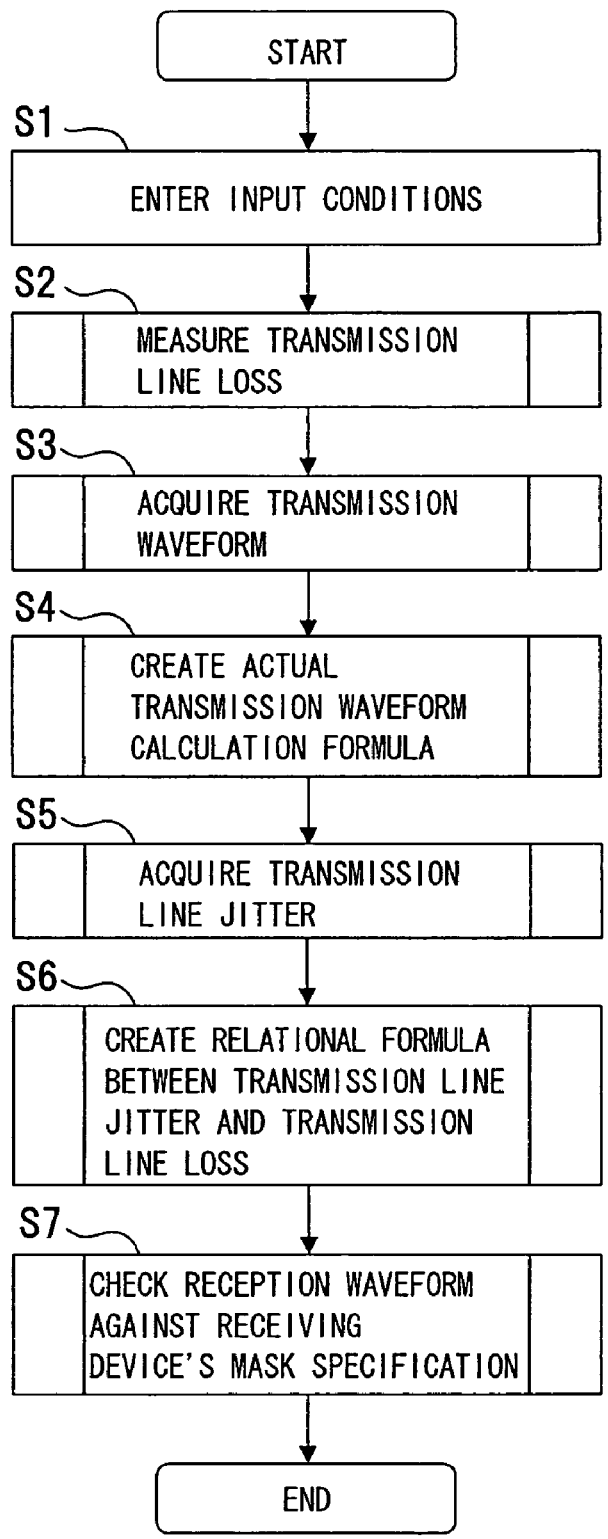
FIG. 7 is a flowchart showing the process steps of a transmission margin verification method and verification program thereof according to the first embodiment.

Description will be given next of the transmission margin verification method and verification program thereof according to the first embodiment of the present invention with reference to FIG. 7. FIG. 7 shows the process steps of the transmission margin verification method and verification program thereof.

The transmission margin verification consists of the process steps of entering input conditions (step S1), measuring the transmission line loss (step S2), acquiring the transmission waveform (step S3), creating an actual transmission waveform calculation formula (step S4), acquiring the transmission line jitter (step S5), creating a relational formula between the transmission line jitter and the transmission line loss (step S6) and checking the reception waveform against the receiving device's mask specification (step S7).

In the entry of various input conditions (step S1) various input conditions are entered into the tester controller 12 for the verification. More specifically, input conditions include the transmission speed, the transmission distance and the input/output specifications of the devices used. With reference to the target device 44 in FIG. 5 in relation to these input conditions, the transmission distance is the transmission line length, whereas the input/output specifications of the devices used include the output amplitude, Tr/Tf, the output jitter and the mask specification.

Figure 9:
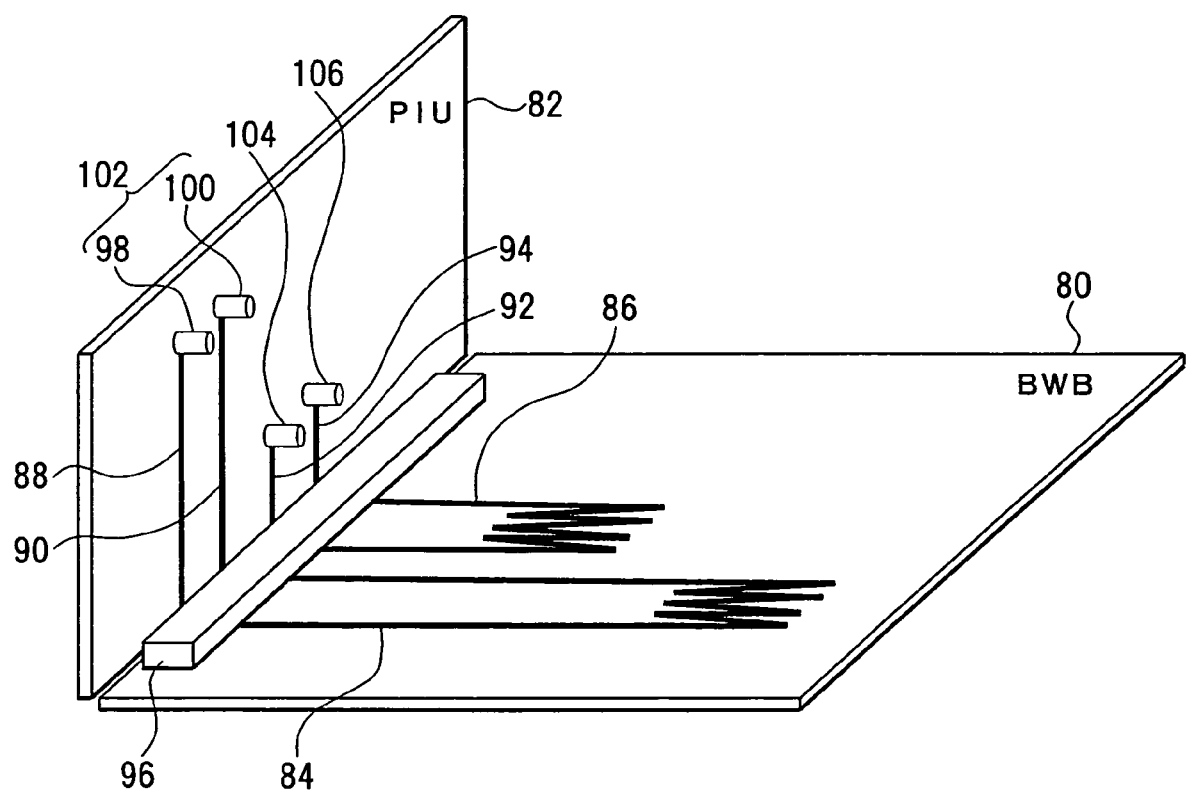
FIG. 9 shows a configuration of pseudo transmission lines configured to measure the transmission line loss.
Figure 10:
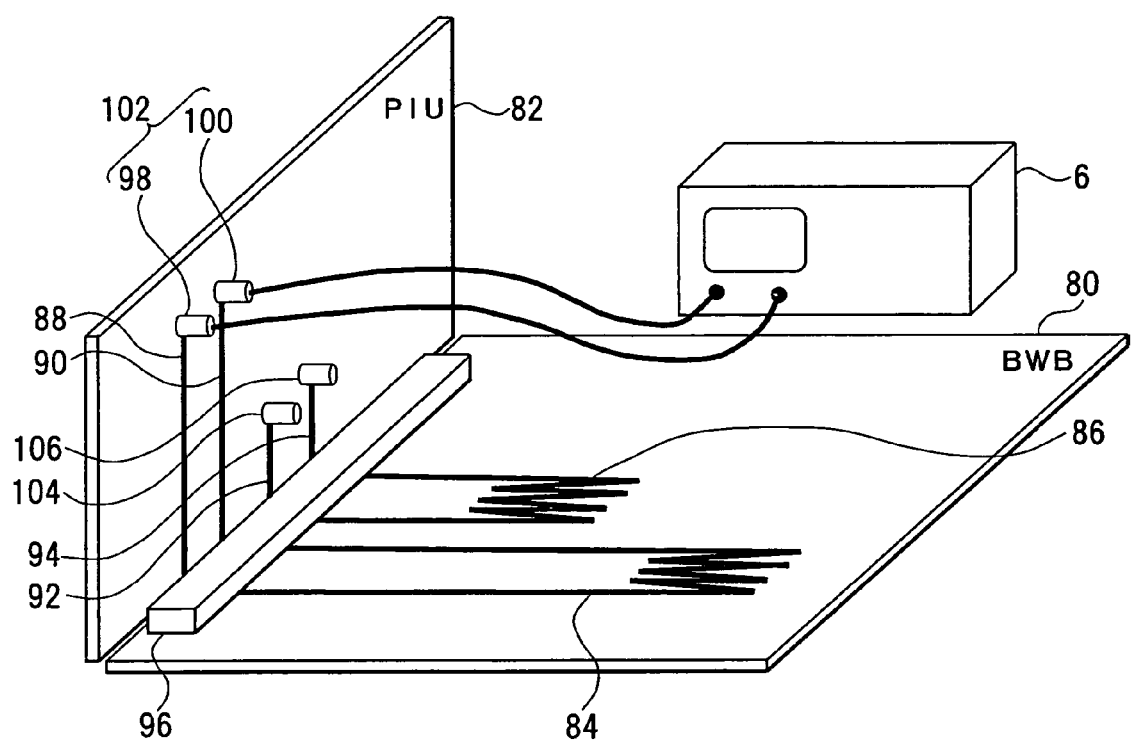
FIG. 10 shows a configuration of the pseudo transmission line to which a network analyzer is connected.

In the measurement of the transmission line loss (step S2), the test board 20 operable to measure the transmission line loss is attached to the test head of the LSI tester 4 to measure the transmission line loss in a transmission line having a different transmission line length placed on the test board 20 (e.g., FIGS. 9 and 10). The network analyzer 6 is used in this measurement of the transmission line loss, and the network analyzer 6 is connected externally to the test board 20. The transmission line loss is the losses in the transmission lines 56, 62 and 66 and that at the connectors 58 and 60 in the target device 44.

Figure 11:
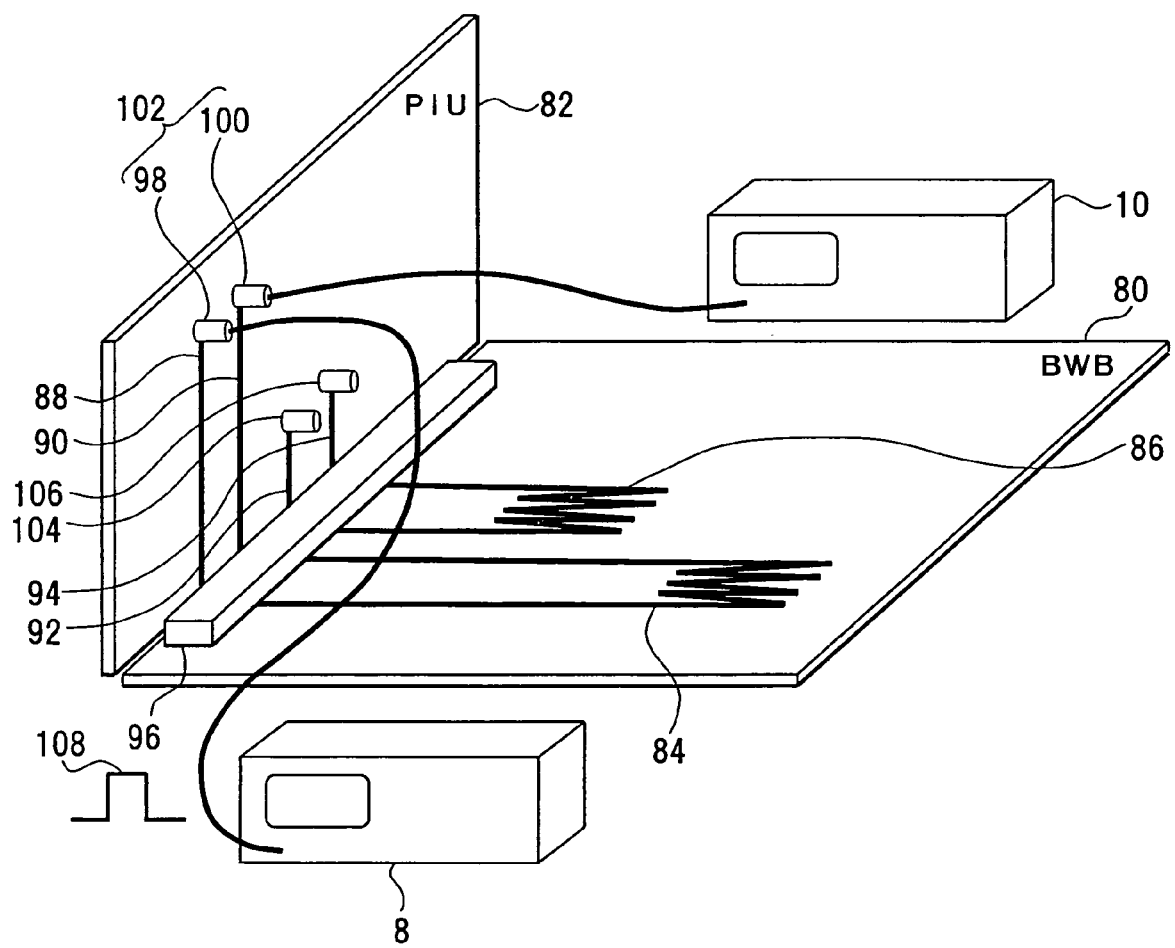
FIG. 11 shows a configuration of the pseudo transmission line to which a pulse generator and an oscilloscope are connected.

In the acquisition of the transmission waveform (step S3), the pulse generator 8 and the oscilloscope 10 are used to acquire the post-transmission leading edge waveforms of the aforementioned transmission lines whose transmission line losses were measured (e.g., FIG. 11). A signal is fed to each of the transmission lines from the pulse generator 8 to acquire the post-transmission leading edge waveform with the oscilloscope 10.

Figure 8:
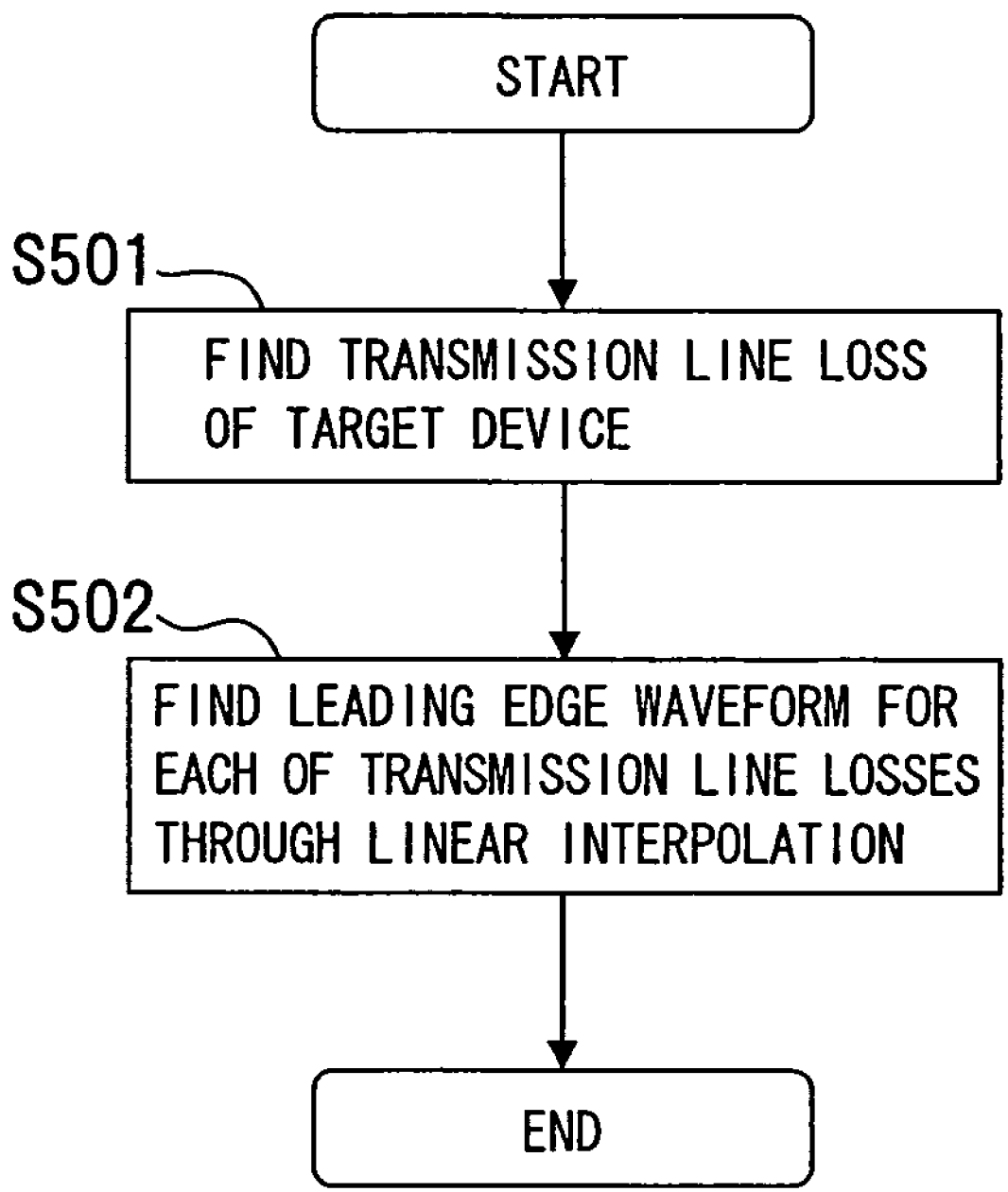
FIG. 8 is a flowchart showing a calculation process of the transmission line loss of the target device.

In the creation of an actual transmission waveform calculation formula (step S4), a formula is created that calculates an actual transmission waveform from the transmission line loss and the transmission waveform. Here, the term "actual transmission waveform" refers to the transmission waveform 74 of the target device 44 (FIG. 6). The steps of creating the calculation formula are as shown in FIG. 8. That is, the transmission line loss of the target device is found (step S501), followed by finding, through linear interpolation, the leading edge waveform under the condition of the transmission line loss of the target device 44 from the leading edge waveform for each of the transmission line losses measured in steps S2 and S3 in the same way of calculation of the receiving end waveform (step S502).

In the acquisition of the transmission line jitter (step S5), the pulse generator 8 and the oscilloscope 10 are used to acquire the post-transmission increase in jitter in the transmission lines whose transmission losses were measured in step S2. A signal is fed to each of the transmission lines from the pulse generator 8 to acquire the post-transmission increase in jitter with the oscilloscope 10 (e.g., FIG. 11).

In the creation of a relational formula between the transmission line jitter and the transmission line loss (step S6), the results of steps S2 and S5 are used to create a relational formula between the transmission line jitter and the transmission line loss.

In the checking of the reception waveform against the receiving device 54's mask specification (step S7), the results of steps S4 and S6 are used to create a relational diagram between the post-transmission reception waveform and the receiving device 54. This diagram is used to make a pass/fail judgment on the reception waveform. That is, a diagram representing the waveform margin (FIG. 12) is created to make a pass/fail judgment on the waveform margin.

Description will be given next of the transmission line loss measurement in the transmission lines corresponding to the target device with reference to FIGS. 9, 10 and 11. FIG. 9 shows a configuration of pseudo transmission lines configured to measure the transmission line loss. FIG. 10 shows a configuration of the pseudo transmission line to which the network analyzer is connected. FIG. 11 shows a configuration of the pseudo transmission line to which the pulse generator and the oscilloscope are connected.

The PT board (BWB) 80 and the PT board (PIU) 82 are provided to configure pseudo transmission lines as shown in FIG. 9. These PT boards are connected orthogonally to each other. On the PT board 80, a plurality of transmission lines 84 and 86 having different lengths are provided adjacent to each other as pseudo transmission lines. On the PT board 82, transmission lines 88 and 90 corresponding to the transmission line 84 and transmission lines 92 and 94 corresponding to the transmission line 86 are provided. A connector 96 provides a connection between the transmission line 84 and the transmission lines 88 and 90 and a connection between the transmission line 86 and the transmission lines 92 and 94. A terminal 98 of the transmission line 88 is set up as the transmitting end, whereas a terminal 100 of the transmission line 90 is set up as the receiving end. A transmission waveform measurement system 102 is made up of the transmission lines 84, 88 and 90 and the terminals 98 and 100. The noise source 42 (FIG. 4) operable to measure the connector crosstalk is connected to a terminal 104 of the transmission line 92 and a terminal 106 of the transmission line 94.

In such a configuration, the network analyzer 6 is connected to the terminals 98 and 100 as shown in FIG. 10 to acquire the output in response to a specific input through the transmission lines 84, 88 and 90. This allows the transmission line losses of the transmission lines 84, 88 and 90 to be measured by the network analyzer 6.

In the above configuration, on the other hand, the pulse generator 8 is connected to the terminal 98, and the oscilloscope 10 is connected to the terminal 100 as shown in FIG. 11. In this case, the terminal 98 is fed with a pulse 108 having a given amplitude from the pulse generator 8. The pulse 108 is propagated to the transmission lines 84, 88 and 90, and then the reception waveform of the pulse is retrieved from the terminal 100 and fed to the oscilloscope 10. As a result, the leading edge of the reception waveform is measured on the oscilloscope 10.

Figure 12:
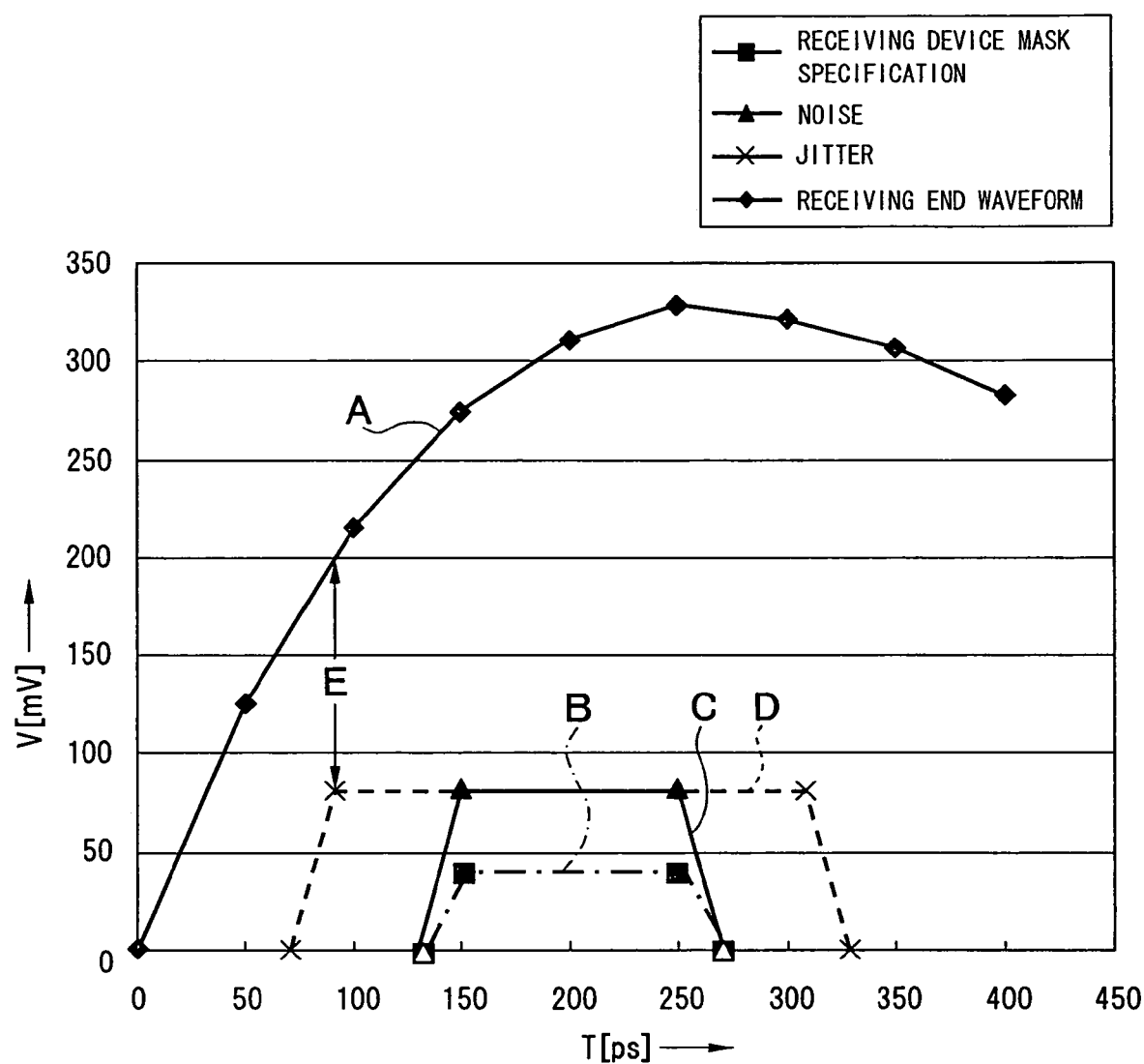
FIG. 12 shows a leading edge at a receiving end waveform, a mask specification of a receiving device, a jitter, and noise.

Description will be given next of the waveform margin measurement with reference to FIG. 12. In FIG. 12, a time T [ps] is taken along the horizontal axis, and an amplitude V [mV] is taken along the vertical axis to show the waveform margin.

In this waveform margin, "A" denotes the leading edge of the receiving end waveform, "B" the mask specification of the receiving device, "C" the noise and "D" the jitter. In this case, the receiving device involves the mask specification B, and the mask specification B indicates that the waveform cannot be received unless the waveform exceeds the range of the mask specification B. As for the noise C, the waveform is buried in noise unless the waveform exceeds the range of the noise C. To capture the receiving end waveform, on the other hand, the waveform must exceed the range of the jitter D. In this case, the receiving end waveform A exists in excess of the range of the jitter D, and the difference in amplitude between the receiving end waveform A and the jitter D on a specific time axis is a transmission margin E.

Figure 13A:
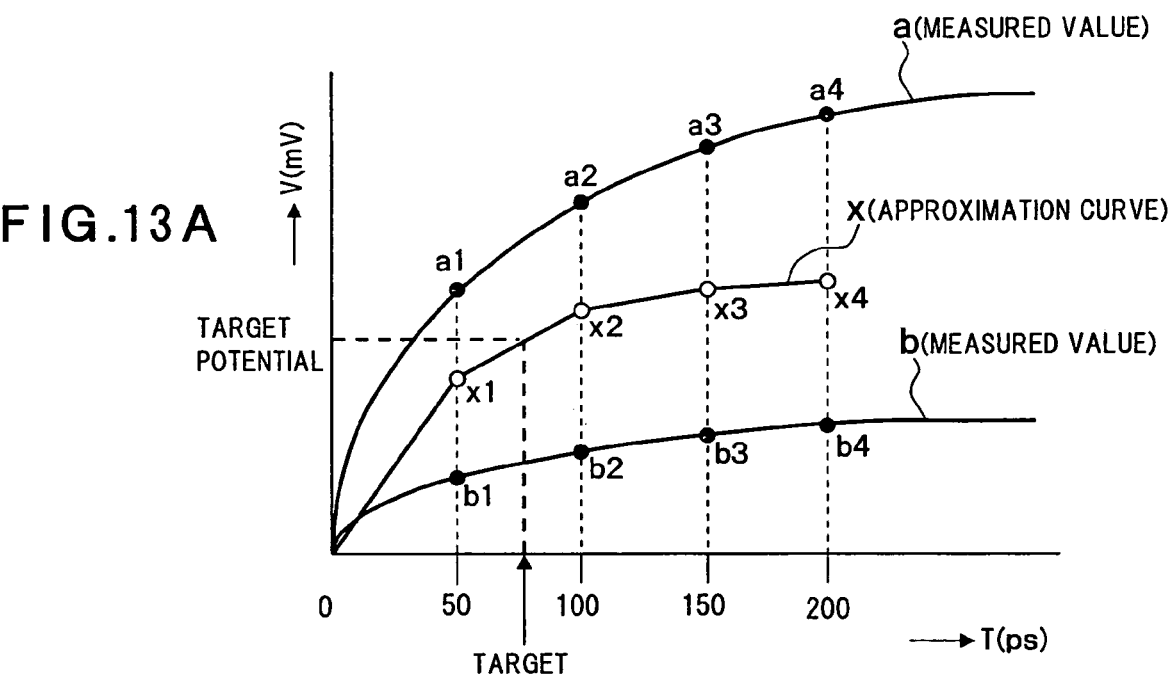
FIGS. 13A and 13B show the calculation of a receiving end waveform.
Figure 13B:
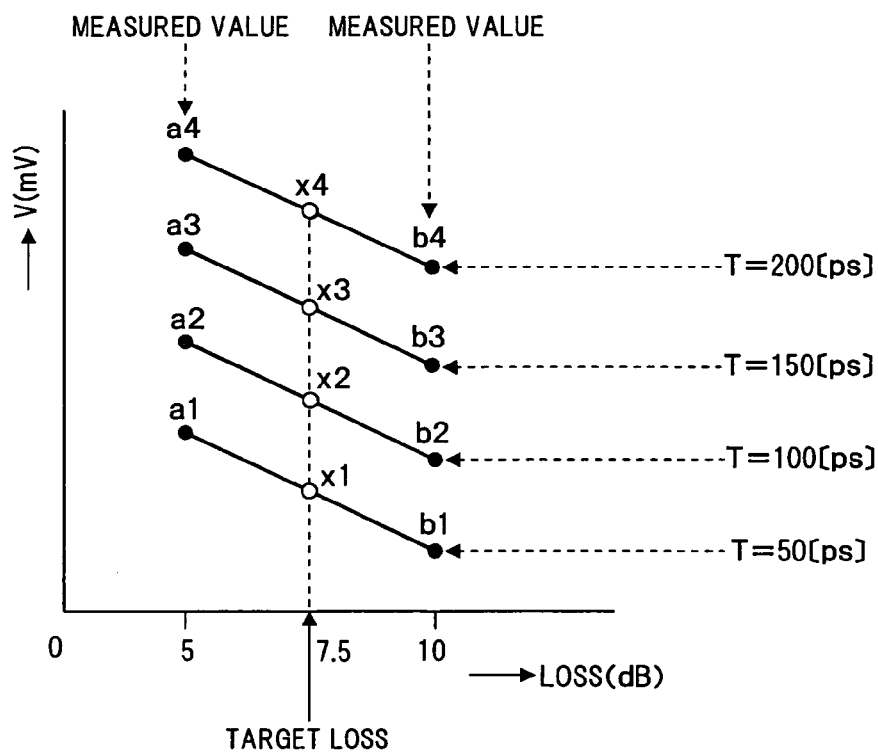

Description will be given next of the calculation of the receiving end waveform with reference to FIGS. 13A and 13B. FIG. 13A shows a measured value curve and an approximation curve with the loss as a parameter. FIG. 13B shows measured values and calculated values with the time as a parameter.

In FIG. 13A, the time T [ps] is taken along the horizontal axis, and the potential V [mV] along the vertical axis. A curve a uses, for example, 5 [dB] loss as a parameter to represent the measured values, whereas a curve b uses, for example, 10 [dB] loss as a parameter to represent the measured values. FIG. 13B is created from these measured values a and b. That is, in FIG. 13B, the loss [dB] is taken along the horizontal axis, and the potential V [mV] along the vertical axis to plot individual measured values a1, a2, a3, a4, b1, b2, b3 and b4 of the curves a and b with the time T as a parameter. Here, if 7.5 [dB] is set, for example, as the target loss, then x1, x2, x3 and x4 are obtained as estimated loss values respectively at the midpoints between a1 and b1, between a2 and b2, between a3 and b3 and between a4 and b4. The values x1, x2, x3 and x4 represent the potentials at the target losses obtained from the measured values a1, a2, a3, a4, b1, b2, b3 and b4. When plotted on FIG. 13A, the values x1, x2, x3 and x4 provide an approximation curve x between the curves a and b, thus providing the potential corresponding to the target loss, i.e., 7.5 [dB]. The receiving end waveform is calculated from this potential.

Figure 14:
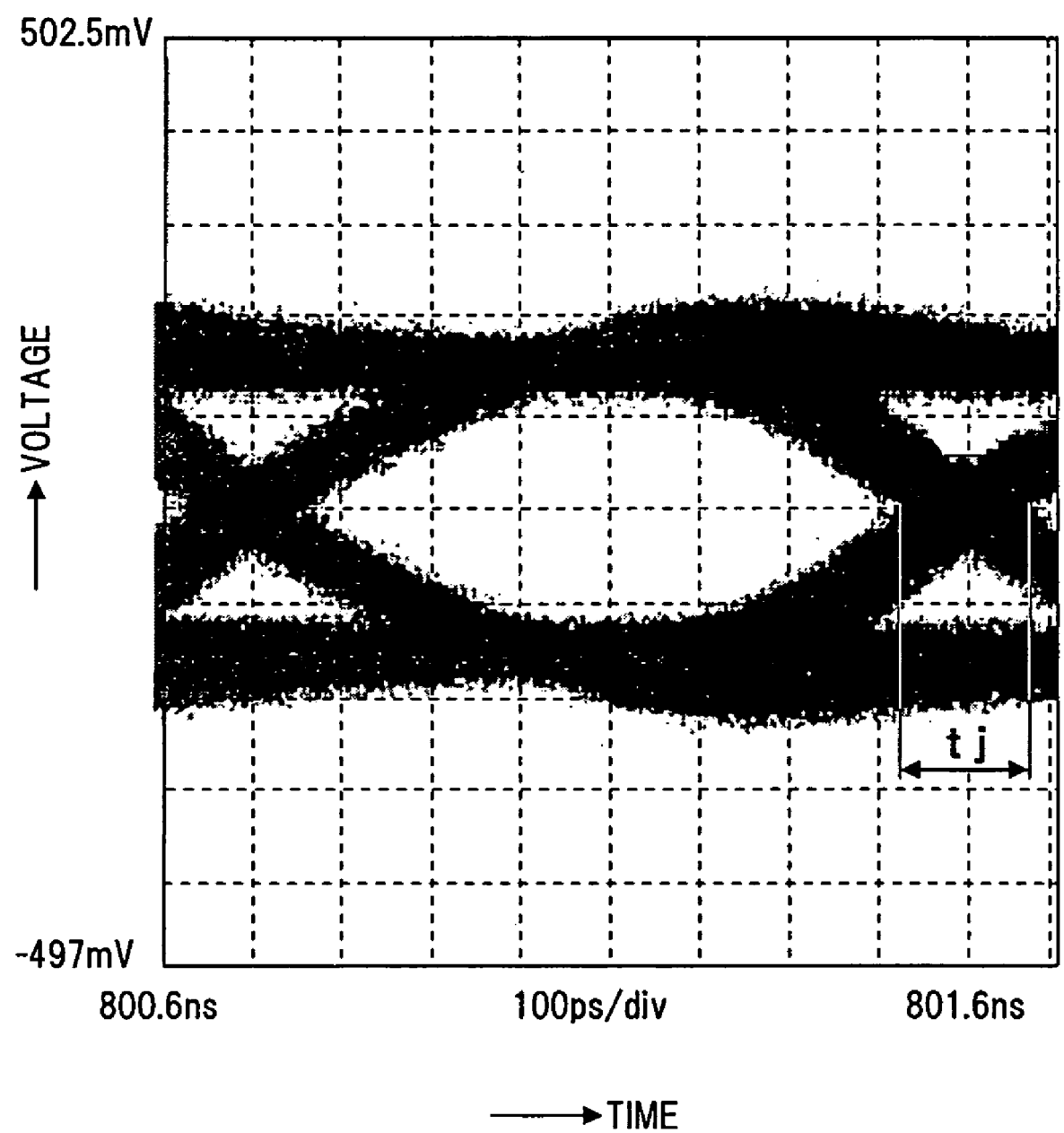
FIG. 14 shows a waveform used to measure the transmission line jitter.

Description will be given next of the measurement of the transmission line jitter with reference to FIG. 14. FIG. 14 shows the transmission waveforms of a PRBS (Pseudo Random Binary Sequence) random pattern that are overlaid one above the other.

Although the transmission line jitter is the increase in jitter when the jitter before the transmission is compared with that after the transmission, this jitter is generally called inter-code interference. In this case, the transmission line jitter is the difference in time between the leading edge waveform of the signal with the shortest period and that of the signal with the longest period in the communication protocol applied to the target device 44. Here, the histogram of the cross point is measured in the overlaid transmission waveforms shown in FIG. 14. More specifically, a time tj of the cross point in the overlaid transmission waveforms shown in FIG. 14 represents the jitter. The transmission line jitter can be measured from the time tj.

Second Embodiment

Figure 15:
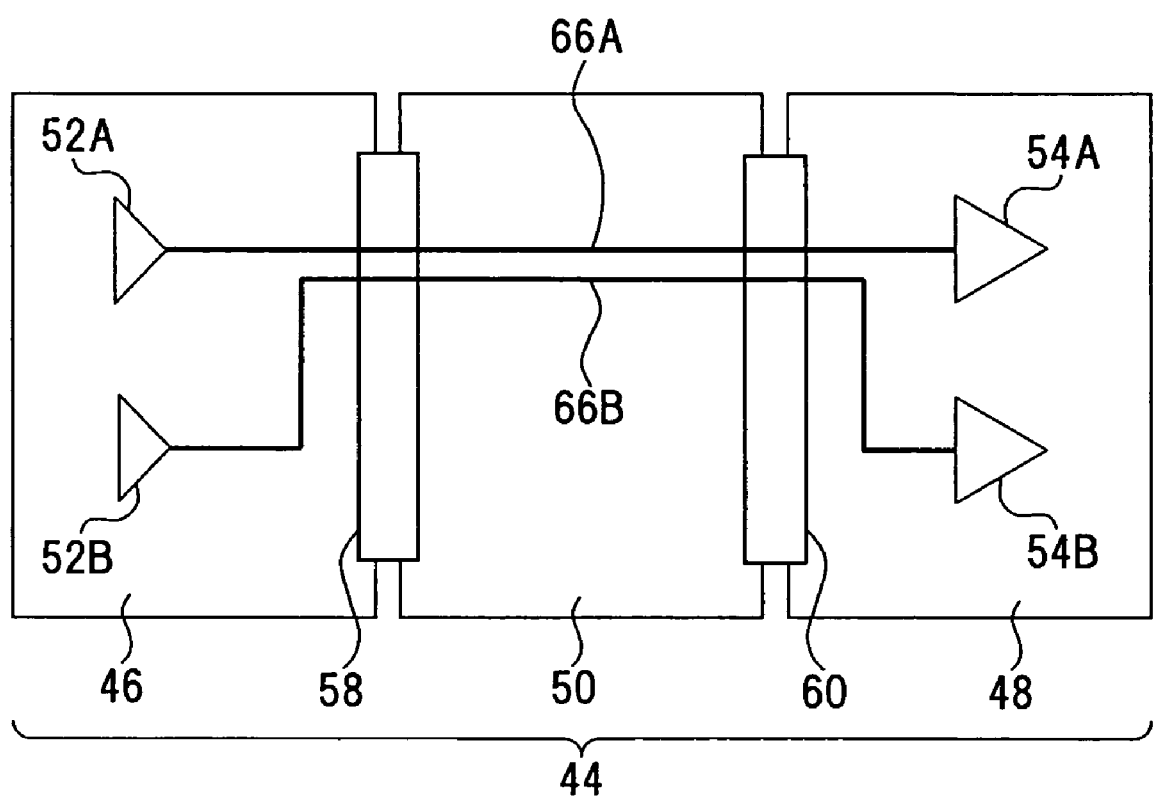
FIG. 15 shows a configuration of the target device according to a second embodiment.
Figure 16:
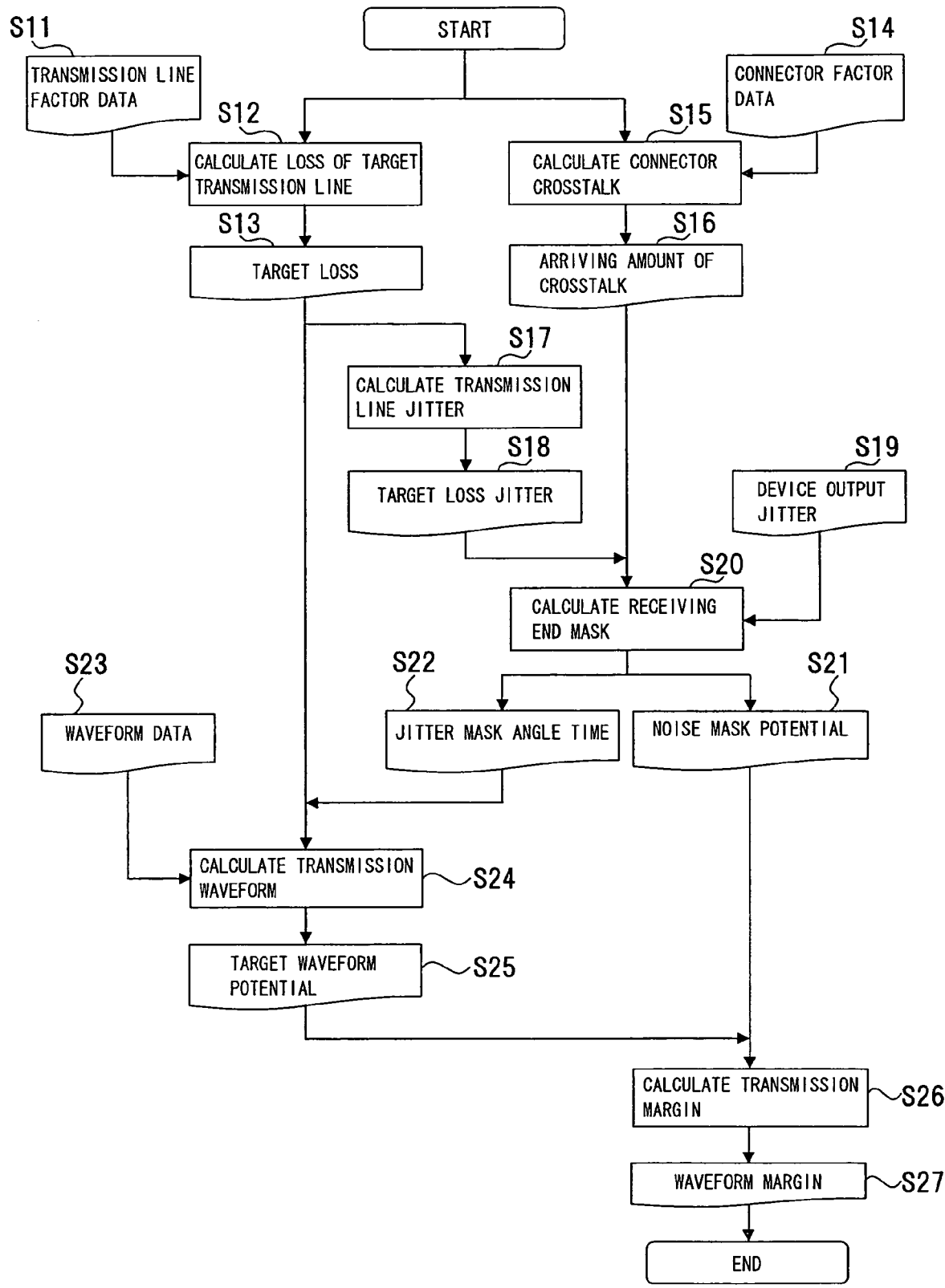
FIG. 16 is a flowchart showing the process steps of the transmission margin verification method and verification program thereof according to the second embodiment.

Description will be given next of the transmission margin verification method and verification program thereof according to a second embodiment with reference to FIGS. 15 and 16. FIG. 15 shows an outline of the target device whose transmission margin is to be calculated, whereas FIG. 16 shows the transmission margin calculation steps. The same reference numerals are used for the same components as those in FIGS. 5 and 6.

To simplify the description in this embodiment, the simplified target device 44 is used, for example, as shown in FIG. 15. This target device 44 is provided with the PT boards 46, 48 and 50 that are connected to each other with the connectors 58 and 60. Transmitting devices 52A and 52B are provided on the PT board 46, whereas receiving devices 54A and 54B are provided on the PT board 48. A transmission line 66A, i.e., a target transmission system, mediates between the transmitting device 52A and the receiving device 54A, whereas a transmission line 66B, i.e., a noise source transmission system, mediates between the transmitting device 52B and the receiving device 54B. The transmission lines 66A and 66B make up a transmission system whose transmission margin is to be calculated.

To calculate the transmission margin in the target device 44 as described above, the transmission line factor data is found in advance (step S11), and this transmission line factor data is used to calculate the loss in the target transmission line (step S12) as shown in FIG. 16. In the calculation of the transmission line loss, a transmission speed S [bps] of the signal to be transmitted is determined. For example, the transmission speed is set to 2.5 [Gbps]. In this case, the transmission line factor data includes a loss LOSSpt per unit length of the PT board [dB/m], a PT board length LENpt [m], a loss LOSScn per connector [dB/connector] and a connector count Ncn [pcs] as the data required for the loss calculation in the target device 44, that is, the target transmission system. Here, the loss LOSSpt per unit length of the PT board is the loss per unit length at the frequency corresponding to the shortest period at which the transmitted data changes. This value is obtained through actual measurement or simulation using a simulator or by other method. The PT board length LENpt is a determining factor of the length of the target transmission system. The loss LOSScn per connector is the loss per unit length at the frequency corresponding to the shortest period at which the transmitted data changes. The connector count Ncn is the number of connectors used in the target transmission system.

These pieces of the transmission line factor data are used to calculate a target loss LOSStarget [dB] (step S13). Here, the target loss LOSStarget is the loss of the entire target transmission system calculated from the aforementioned factor data and calculated from the following formula:

$$\text{LOSStarget} = \text{LOSSpt} * \text{LENpt} + \text{LOSScn} * \text{Ncn} \quad (1)$$

The target loss LOSStarget is displayed on the display unit 30 (FIG. 2) as the calculation result.

Concurrently with the calculation of the target loss, on the other hand, the connector factor data is found in advance (step S14), and the connector factor data is used to calculate the connector crosstalk (step S15). Here, the connector crosstalk is expressed as a crosstalk ratio Xcnr [%], and the crosstalk ratio Xcnr represents what percentage of noise of the noise source amplitude is induced into the target transmission system by the connector alone. This measurement must be conducted through time axis measurement using the noise source having the smallest possible TrTf. The calculation of the connector crosstalk includes the calculation of the amount of crosstalk generated in the target device 44 and the calculation of the peak value of noise reaching the receiving device 54. Here, among the connector factor data required for the former calculation of the amount of crosstalk generated are a TrTf increase rate Ktrtf, a noise source transmission system length LENxcnn [m], a noise source transmission system loss LOSSxtn [dB], an arriving noise source TrTf:Tcn [ps], a single TrTf dependency coefficient Kxt, a noise source transmission amplitude Vxncnt [V] and a noise source amplitude Vxncn [V]. On the other hand, among the connector factor data required for the latter calculation of the noise peak value are a noise peak attenuation coefficient Knp, a noise peak transmission length LENxcnt in the target transmission system [m] and a noise peak transmission loss LOSSxcnt in the target transmission system [dB].

Here, the TrTf increase rate Ktrtf is a coefficient showing the relationship between the amount of TrTf increase during the transmission of the noise source over the transmission line and the transmission line loss. The noise source transmission system length LENxcnn is the distance over which the noise source is transmitted before the noise source reaches the connector. The noise source transmission system loss LOSSxtn is the PT board loss transmitted from when the noise source is output from the transmitting device 52 to when the noise source reaches the connector. This value is calculated from the following formula:

$$\text{LOSSxtn} = \text{LOSSpt} * \text{LENxcnn} \quad (2)$$

The arriving noise source TrTf:Tcn is the TrTf at the time of arrival of the noise source at the connector and is calculated from the following formula:

$$\text{Tcn} = \text{Ktrtf} * \text{LOSSxtn} \quad (3)$$

The single TrTf dependency coefficient Kxt changes the TrTf of the noise source and is the dependency of the crosstalk ratio Xcnr. The noise source transmission amplitude Vxncnt is the amplitude at the point of output of the noise source from the transmitting device 52. The noise source amplitude Vxncn is the amplitude at the time of arrival of the noise source at the connector and is calculated from the following formula:

$$\text{Vxncn} = \text{Vxncnt} * 10^{(-\text{LOSSxtn}/20)} \quad (4)$$

On the other hand, an amount of crosstalk Vxtcn [V] generated in the target device 44 is the amount of connector crosstalk generated under the conditions of use in the target device 44 and is calculated from the following formula:

$$\text{Vxtcn} = \text{Vxncn} * \text{Kxt} * \text{Tcn} * \text{Xcnr} \quad (5)$$

As described above, the processes including formulas (2), (3) (4) and (5) are used to calculate the connector crosstalk (step S15).

Then, the process is executed to calculate the arriving amount of crosstalk, i.e., the amount of crosstalk reaching the receiving device 54 (step S16). Here, the noise peak attenuation coefficient Knp is the coefficient representing the relationship between the amount of attenuation of the noise peak waveform induced into the target transmission system during the transmission over the transmission line and the loss in the transmission line transmitting the waveform. The noise peak transmission length LENxcnt in the target transmission system is the length of the PT board over which the noise peak induced in the target transmission system is transmitted before reaching the receiving device 54. A noise peak transmission loss LOSSxcnt in the target transmission system is the PT board loss transmitted before the noise peak induced in the target transmission system reaches the receiving device 54. This loss is calculated from the following formula:

$$\text{LOSSxcnt} = \text{LOSSpt} * \text{LENxcnt} \quad (6)$$

An arriving noise peak value Vxtcnr [V] is the peak voltage of the noise peak induced into the target transmission system at the time of arrival at the receiving device 54 and calculated from the following formula:

$$\text{Vxtcnr} = \text{Vxtcn} * \text{Knp} * \text{LOSSxcnt} \quad (7)$$

As described above, the processes including formulas (6) and (7) are used to calculate the arriving amount of crosstalk (step S16).

Then, the transmission line jitter is calculated (step S17). This calculation of the transmission line jitter includes losses Lt1 [dB] and Lt2 [dB] at both ends of the target loss section, transmission line jitters Jt1 [UI] and Jt2 [UI] at both ends of the target loss section and a target loss transmission line jitter Jtt [UI]. In the measurement of the losses Lt1 and Lt2 at both ends of the target loss section, the transmission line jitter is measured in a plurality of transmission lines having a discrete loss to calculate between which two discrete losses the loss LOSStarget, i.e., the loss used to calculate the margin, falls. These losses are Lt1 and Lt2. The transmission line jitters Jt1 and Jt2 at both ends of the target loss section are the transmission line jitters corresponding to the losses Lt1 and Lt2 at both ends of the target loss section. The target loss transmission line jitter Jtt is the transmission line jitter at the target loss linearly approximated using the loss and calculated from the following formula (step S18):

$$Jtt=Jt1+(Jt2-Jt1)/(Lt2-Lt1)*(LOSStarget-Lt1) \quad (8)$$

After the calculation of the target loss jitter, the device output jitter found in advance (step S19) is used to calculate the receiving end mask (step S20). In this calculation of the receiving end mask, a one-bit-wide time T (=1/S) [s], a mask center time Tmc (=T/2) [s], a mask time width Tmw [s], a device mask angle time Tmd [s], a device mask amplitude Vmd [s] and a device output jitter Jo [s] are used to calculate a noise mask potential Vmsn [V] (step S21) and a jitter mask angle time Tmj [s] (step S22).

Here, the one-bit-wide time T is the one-bit-wide time found from the data transmission speed. The mask center time Tmc is the receiving mask center time and assumed to be the center time of the one-bit-wide time T. The mask time width Tmw is the mask width along the time axis. The device mask angle time Tmd is the time that serves as the mask angle and calculated from the following formula:

$$Tmd=Tmc-Tmw*2 \quad (9)$$

Normally, the margin in this portion is the tightest of all.

The device mask amplitude Vmd is the mask amplitude, whereas the device output jitter Jo is the output jitter of the transmitting device 52. The noise mask potential Vmsn is the mask potential if the connector margin is added to the device mask and is found from the following formula (step S21)

$$Vmsn=Vmd/2+Vxtcnr \quad (10)$$

The jitter mask angle time Tmj is the mask angle time if the transmission line jitter is added and is calculated from the following formula (step S22):

$$Tmj=Tmd-Jo/2-Jtt/2 \quad (11)$$

Then, the transmission waveform is calculated (step S24) from the target loss (step S13), the jitter mask angle time (step S22) and the waveform data found in advance (step S23) to calculate a target waveform potential Vt (step S25). This target waveform potential Vt and the aforementioned noise mask potential (step S21) are used to calculate the transmission margin (step S26), followed by the calculation of a waveform margin Mw [V] (step S27). In this case, the waveform margin Mw is the voltage difference between the target point of the receiving end mask (the noise mask potential Vmsn at the jitter mask angle time Tmj) and the target waveform potential Vt. This margin is calculated as follows from the target waveform potential Vt found by formula (15) and the noise mask potential Vmsn found by formula (10):

$$Mw=Vt-Vmsn \quad (12)$$

Figure 17:
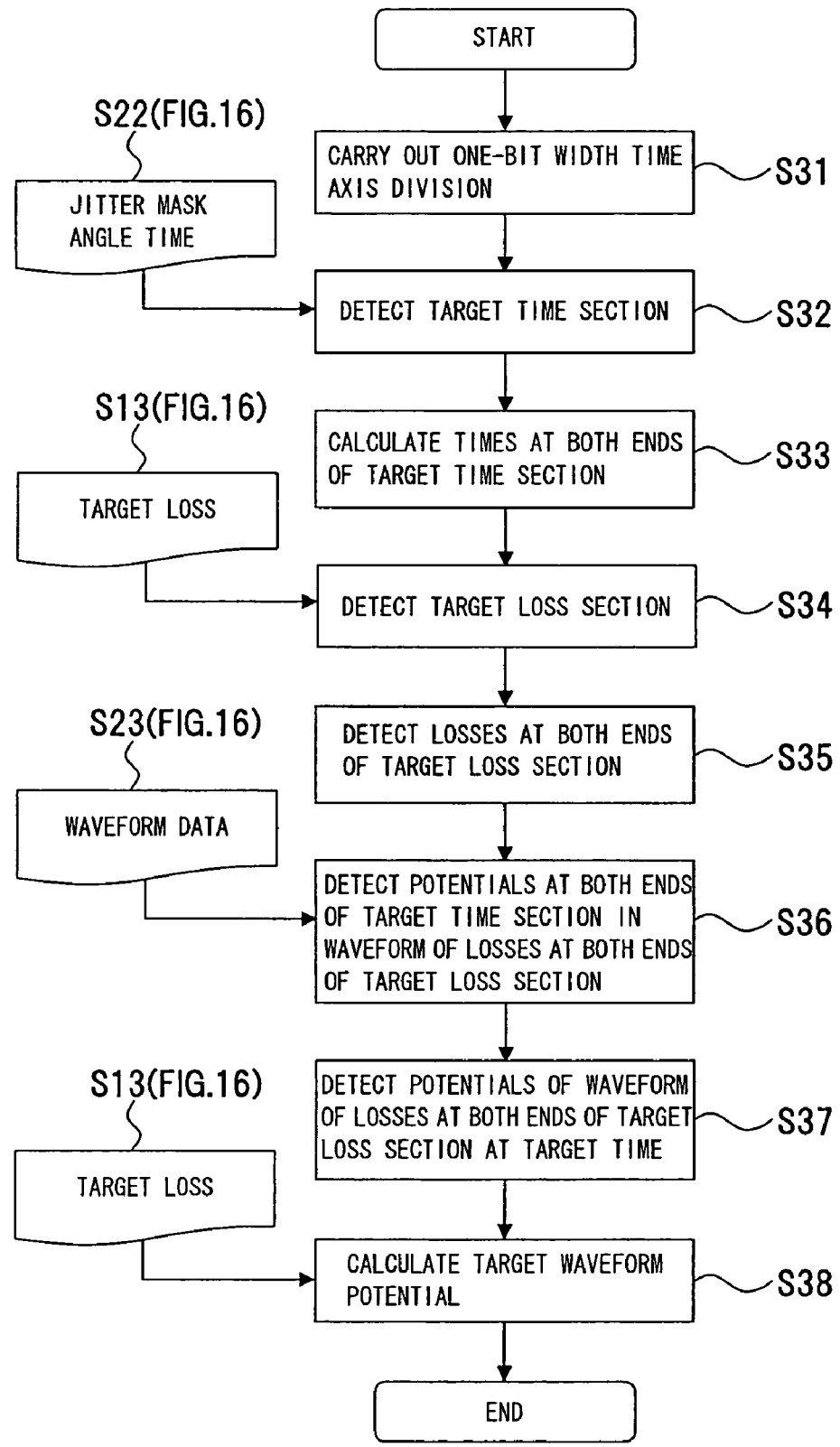
FIG. 17 is a flowchart showing the steps of a waveform calculation process.

Description will be given next of the transmission waveform calculation (step S24) in the transmission margin calculation steps with reference to FIG. 17. FIG. 17 is a flowchart showing the steps of calculating the transmission waveform.

In this transmission waveform calculation process, the one-bit width time axis division is carried out that is the one-bit width division count, i.e., the resolution of the waveform calculation (step S31). Then, the already calculated jitter mask angle time {step S22 (FIG. 16)} is used to detect the target time section (step S32) followed by the calculation of the times at both ends of the target time section (step S33). This time interval and the aforementioned target loss {step S13 (FIG. 16)} are used to detect the target loss section (step S34) and the losses at both ends of the target loss section (step S35). The aforementioned waveform data {step S23 (FIG. 16)} is referenced to detect the potentials at both ends of the target time section in the waveform of losses at both ends of the target loss section (step S36) and to detect the potentials of the waveform of losses at both ends of the target loss section at the target time (step S37). Then, the target loss {step S13 (FIG. 16)} is referenced to calculate the target waveform potential (step S38).

In this calculation of the transmission waveform, a one-bit width division count Ns [s], times Tt1 [s] and Tt2 [s] at both ends of the target time section, losses Lt1 [dB] and Lt2 [dB] at both ends of the target loss section, and potentials Vlt11 [V], Vlt12 [V], Vlt21 [V] and Vlt22 [V] at both ends of the target time section of the waveform of losses at both ends of the target loss section are used to calculate potentials Vt1 [V] and Vt2 [V] of the waveform of losses at both ends of the target loss section at the target time and the target waveform potential Vt [V].

The one-bit width division count Ns is the resolution of the waveform calculation and the number of divisions of one-bit width. The times Tt1 and Tt2 at both ends of the target time section are the division point times at both ends of the section found by calculating into which of the sections, obtained as a result of the division by the one-bit width division count Ns, the jitter mask angle time Tmj falls as the point on the time axis used to calculate the margin. As for the losses Lt1 and Lt2 at both ends of the target loss section, waveform data is obtained for a plurality of transmission lines having a discrete loss. In this case, the signal pattern to acquire the waveform data must be a repetitive signal having successive zero bits equivalent to the protocol used in the device to be reviewed. A one-bit-wide portion from the leading edge of the obtained waveforms is used for the calculation. The calculation is made to determine between which two discrete losses the loss LOSStarget, i.e., the loss used to calculate the margin, falls. The losses Lt1 and Lt2 represent these losses.

The potentials Vlt11, Vlt12, Vlt21 and Vlt22 at both ends of the target time section in the waveform of losses at both ends of the target loss section are the potentials at the times at both ends of the target time section in the waveform transmitted over the transmission line having the losses at both ends of the target loss section. As for the potentials Vt1 and Vt2 of the waveform of losses at both ends of the target loss section at the target time, the potentials of the waveform transmitted over the transmission line having the losses at both ends of the target loss section at the target time are calculated through linear approximation of the target time section from the following formulas:

$$Vt1=Vlt11+(Vlt12-Vlt11)/(Tt2-Tt1)*(Tmj-Tt1) \quad (13)$$

$$Vt2=Vlt21+(Vlt22-Vlt21)/(Tt2-Tt1)*(Tmj-Tt1) \quad (14)$$

The target waveform potential Vt is the potential of the waveform, used to calculate the margin, through linear approximation using the loss from the potentials Vt1 and Vt2 of the waveform of losses at both ends of the target loss section at the target time and calculated from the following formula:

$$Vt=Vt1+(Vt2-Vt1)/(Lt2-Lt1)*(LOSStarget-Lt1) \quad (15)$$

After these processes, the transmission waveform is calculated from the waveform data and the like, followed by the execution of the aforementioned process to calculate the target waveform potential in step S25 (FIG. 16). After this process, the aforementioned process is executed to calculate the transmission margin in step S26 (FIG. 16). As described above, the waveform margin Mw is the voltage difference between the target point of the receiving end mask (the noise mask potential Vmsn at the jitter mask angle time Tmj) and the target waveform potential Vt. This margin is calculated from the target waveform potential Vt found by formula (15) and the noise mask potential Vmsn found by formula (10) using formula (12).

Figure 18:
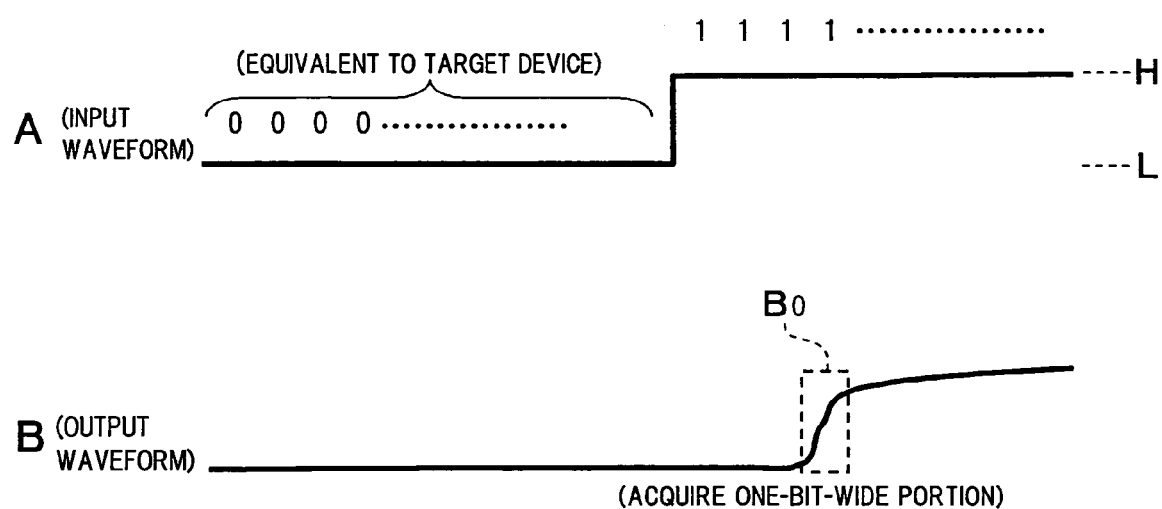
FIG. 18 shows the acquisition of waveform data.

Description will be given next of the acquisition of waveform data with reference to FIG. 18. FIG. 18 shows signal patterns of waveforms input to and output from the target device whose waveform data is to be acquired.

As shown in "A" of FIG. 18, the signal pattern used to acquire the waveform data must be a repetitive signal having successive zero bits equivalent to the protocol used in the device to be reviewed. That is, the L level is "0000 - - - ", whereas the H level is "1111 - - - ." Using these levels as an input waveform allows, for example, an output waveform as shown in "B" of FIG. 18 to be acquired. A one-bit-wide portion Bo, i.e., a leading edge portion of this output waveform, is acquired.

Figure 19:
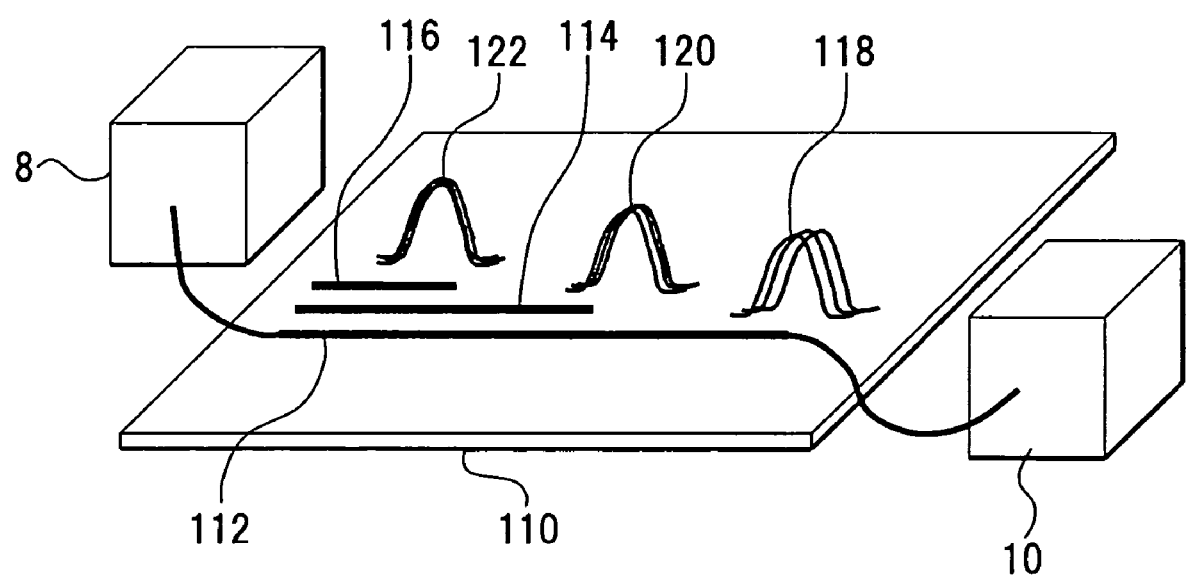
FIG. 19 shows the measurement of the transmission line jitter.

Description will be given next of the measurement of the transmission line jitter with reference to FIG. 19. FIG. 19 shows the measurement of the transmission line jitter.

In this measurement of the transmission line jitter, a plurality of transmission lines 112, 114 and 116 having different transmission lengths are provided on a PT board 110. The pulse generator 8 is connected to the input end of each of the transmission lines 112, 114 and 116 to inject a pulse signal. Output waveforms 118, 120 and 122 are measured respectively for the transmission lines 112, 114 and 116 on the oscilloscope 10 connected to the output end. These output waveforms 118, 120 and 122 can be used to measure the transmission line jitter of each of the transmission lines 112, 114 and 116.

Figure 20:
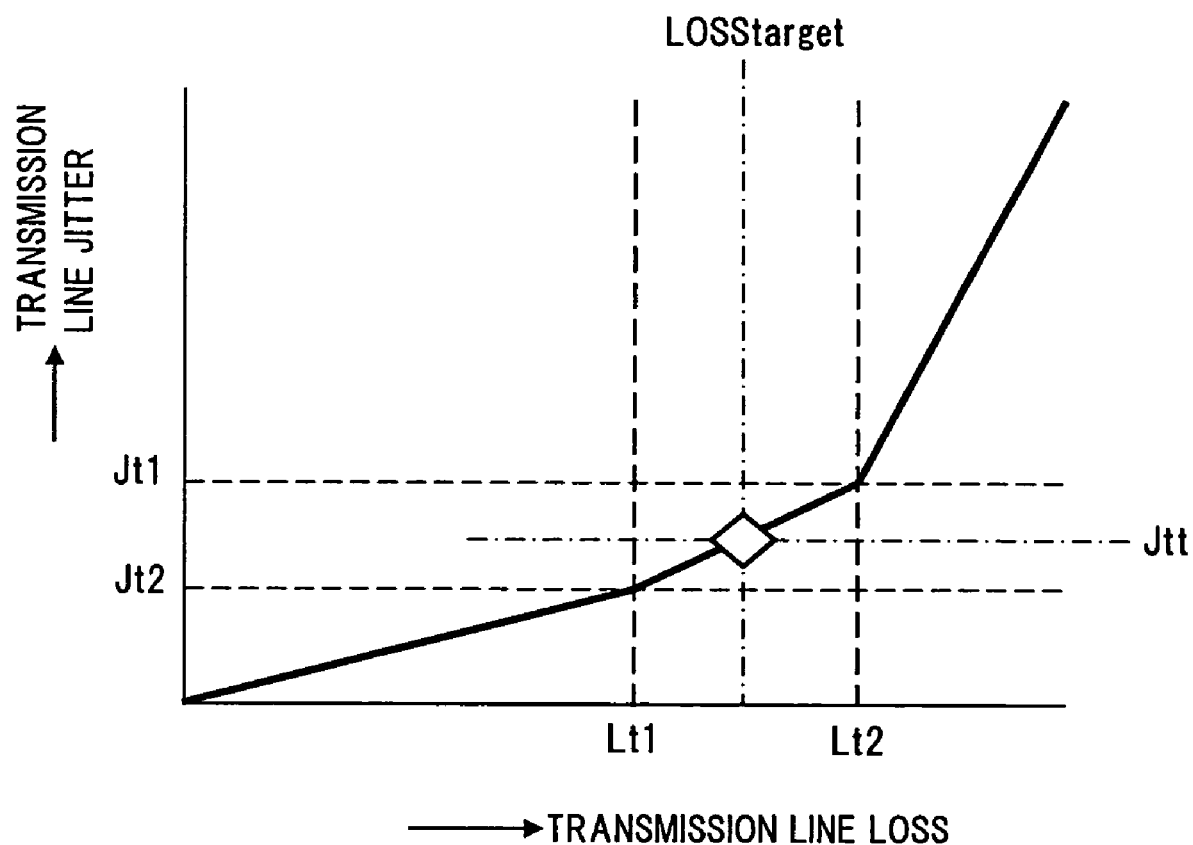
FIG. 20 shows the calculation of the transmission line jitter.

Description will be given next of the calculation of the transmission line jitter with reference to FIG. 20. FIG. 20 shows the transmission line jitter vs the transmission line loss.

To calculate the transmission line jitter, the transmission line loss is taken along the horizontal axis, and the transmission line jitter along the vertical axis as shown in FIG. 20 to find the relationship between the transmission line loss and the transmission line jitter. As described earlier, this calculation of the transmission line jitter employs the losses Lt1 and Lt2 at both ends of the target loss section, the transmission line jitters Jt1 and Jt2 at both ends of the target loss section and the target loss LOSStarget. In the measurement of the losses Lt1 and Lt2 at both ends of the target loss section, the transmission line jitter is measured in a plurality of transmission lines having a discrete loss to calculate between which two discrete losses the lossLOSStarget, i.e., the loss used to calculate the margin, falls. On the other hand, the transmission line jitters Jt1 and Jt2 at both ends of the target loss section are the jitters corresponding to the losses Lt1 and Lt2 at both ends of the target loss section. Therefore, the transmission line jitter is linearly approximated using the losses Lt1 and Lt2 at both ends of the target loss section and the transmission line jitters Jt1 and Jt2 at both ends of the target loss section. As a result, the target loss transmission line jitter Jtt can be obtained from formula (8). That is, the target loss transmission line jitter Jtt corresponding to the target loss LOSStarget can be obtained from the linearly approximated transmission line jitter.

Figure 21:
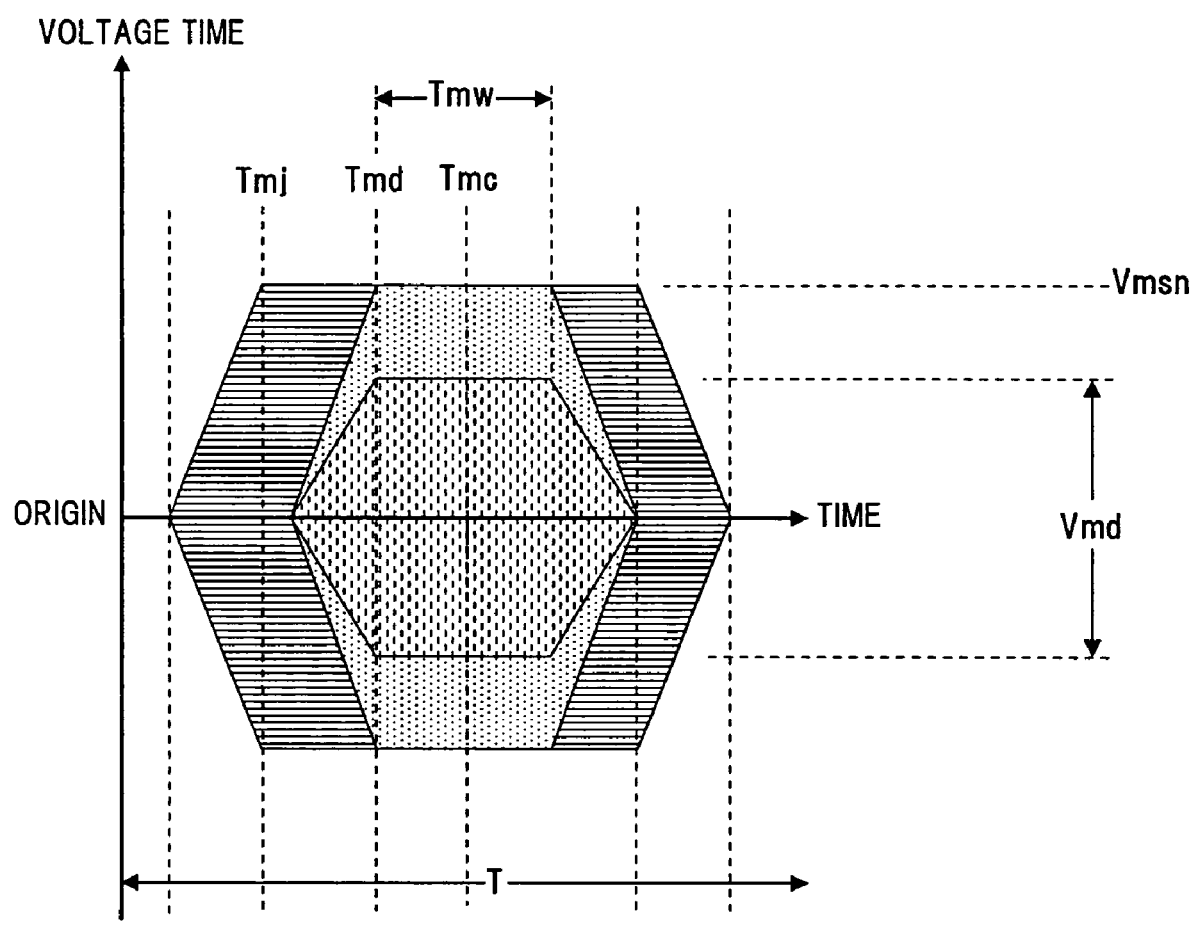
FIG. 21 shows the calculation of the mask at the receiving end.

Description will be given next of the calculation of the receiving end mask with reference to FIG. 21. FIG. 21 shows the noise mask and the receiving end mask.

To calculate the receiving end mask, the time T is taken along the horizontal axis, and the voltage time along the vertical axis as shown in FIG. 21, with the voltage time having the origin at the center, to display the noise mask and the receiving end mask. The one-bit-wide time T (=1/S) is found from the data transmission speed S, and the mask center time Tmc of the receiving end mask is defined to be the center of the one-bit-wide time T. Then, the width of the mask along the time axis is defined to be the mask time width Tmw. The time serving as the mask angle is measured. This time is the device mask angle time Tmd and calculated from formula (9). The noise mask potential Vmsn, i.e., the potential when the connector cross margin is added to the device mask, is calculated from formula (10). The mask amplitude is defined to be the device mask amplitude Vmd, and the jitter mask angle time Tmj, i.e., the time when the output jitter of the transmitting device 52 and the transmission line jitter are added, is calculated from formula (11).

Figure 22:
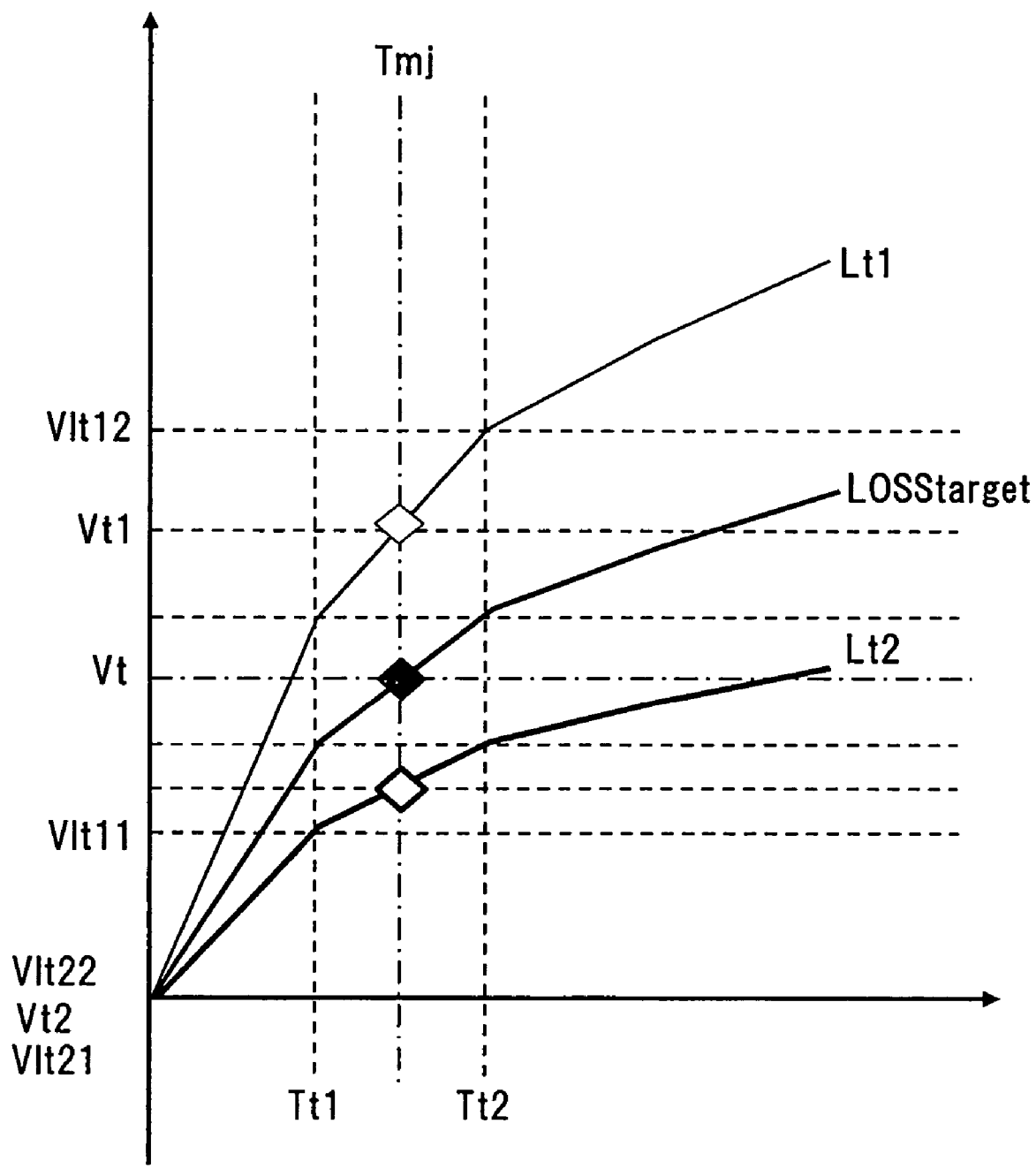
FIG. 22 shows the calculation of the transmission waveform.

Description will be given next of the calculation of the transmission waveform with reference to FIG. 22. FIG. 22 shows the losses Lt1 and Lt2 at both ends of the target loss section and the target loss LOSStarget.

The point on the time axis used to calculate the transmission margin is assumed to be the jitter mask angle time Tmj. The calculation is made to determine into which of the sections, obtained as a result of the division by the one-bit width division count Ns, i.e., the resolution of the waveform calculation, the jitter mask angle time Tmj falls. Then, the division point times at both ends of that section are assumed to be the times Tt1 and Tt2 at both ends of the target time section. Waveform data is obtained for a plurality of transmission lines having a discrete loss. In this case, one-bit-wide portion from the leading edge of the obtained waveforms (Bo in FIG. 18B) is used for the calculation. The calculation is made to determine between which two discrete losses the target loss LOSStarget, i.e., the loss used to calculate the waveform margin, falls. These losses are the losses Lt1 and Lt2 at both ends of the target loss section. In the waveform transmitted over the transmission line having the losses Lt1 and Lt2 at both ends of the target loss section, the potentials at both ends of the target time section are assumed to be Vlt11, Vlt12, Vlt21 and Vlt22. The potentials at the target time are calculated through linear approximation of the times Tt1 and Tt2 at both ends of the target time section. The calculated potentials are assumed to be Vt1 and Vt2. The potentials Vt1 and Vt2 at the target time are found from formulas (13) and (14) as described above. On the other hand, the potential Vt of the waveform used to calculate the transmission margin is found through linear approximation from the potentials Vt1 and Vt2 at the target time.

Then, the voltage difference between the target point of the receiving end mask, i.e., the potential Vmsn at the jitter mask angle time Tmj (FIG. 21), and the target waveform potential Vt (FIG. 22) is assumed to be the waveform margin Mw. This waveform margin Mw is found from formula (12) described above.

Third Embodiment

Figure 23:
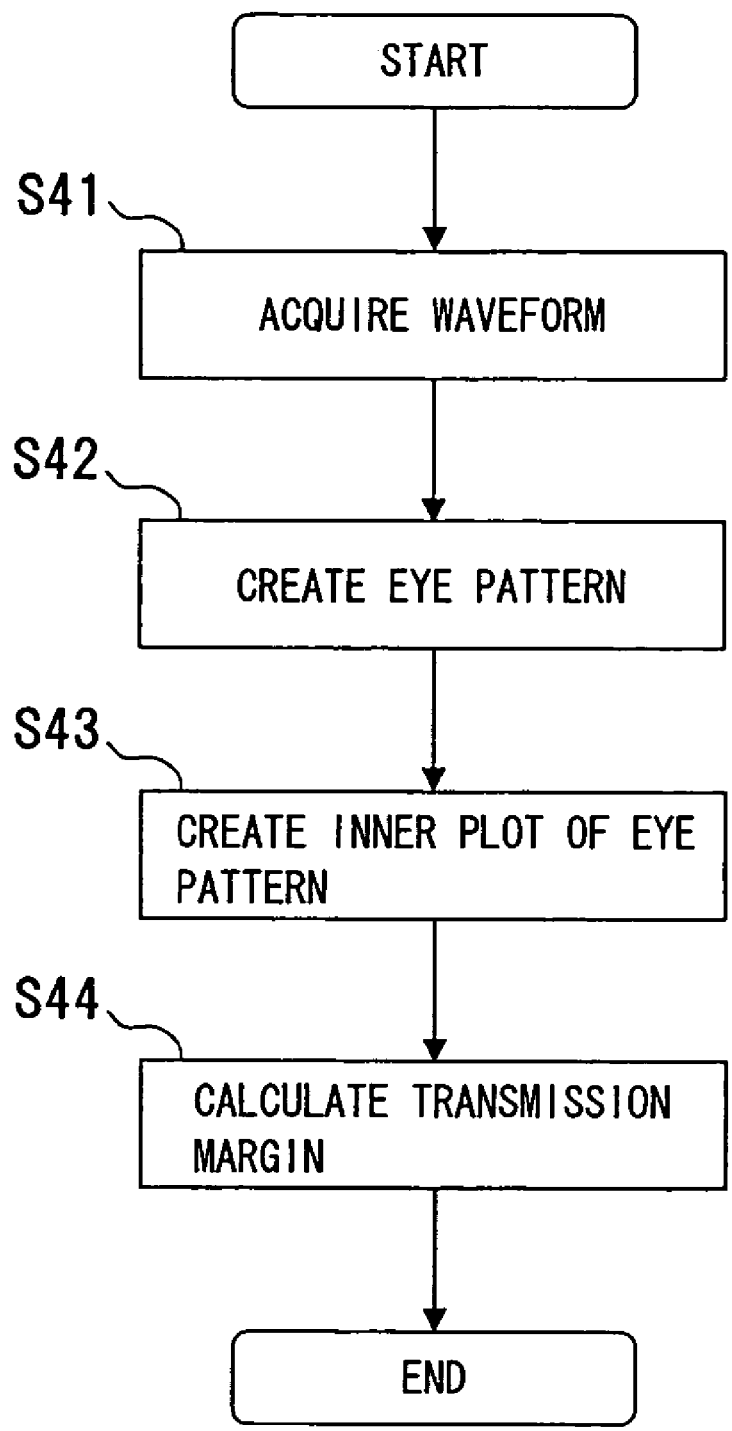
FIG. 23 is a flowchart showing the process steps of the transmission margin verification method and verification program thereof according to a third embodiment.
Figure 24:
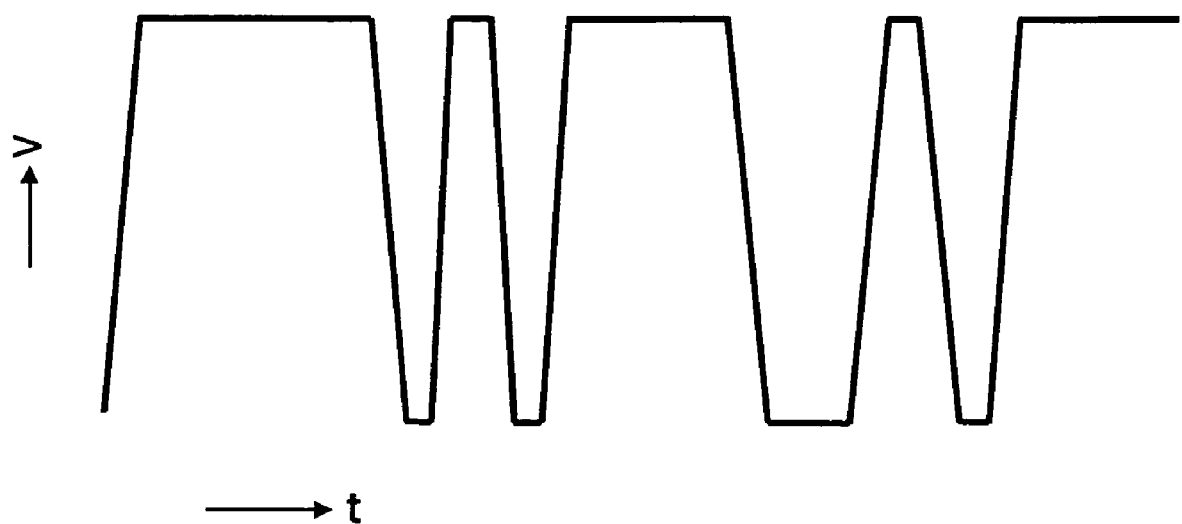
FIG. 24 shows the transmission waveform.
Figure 25:
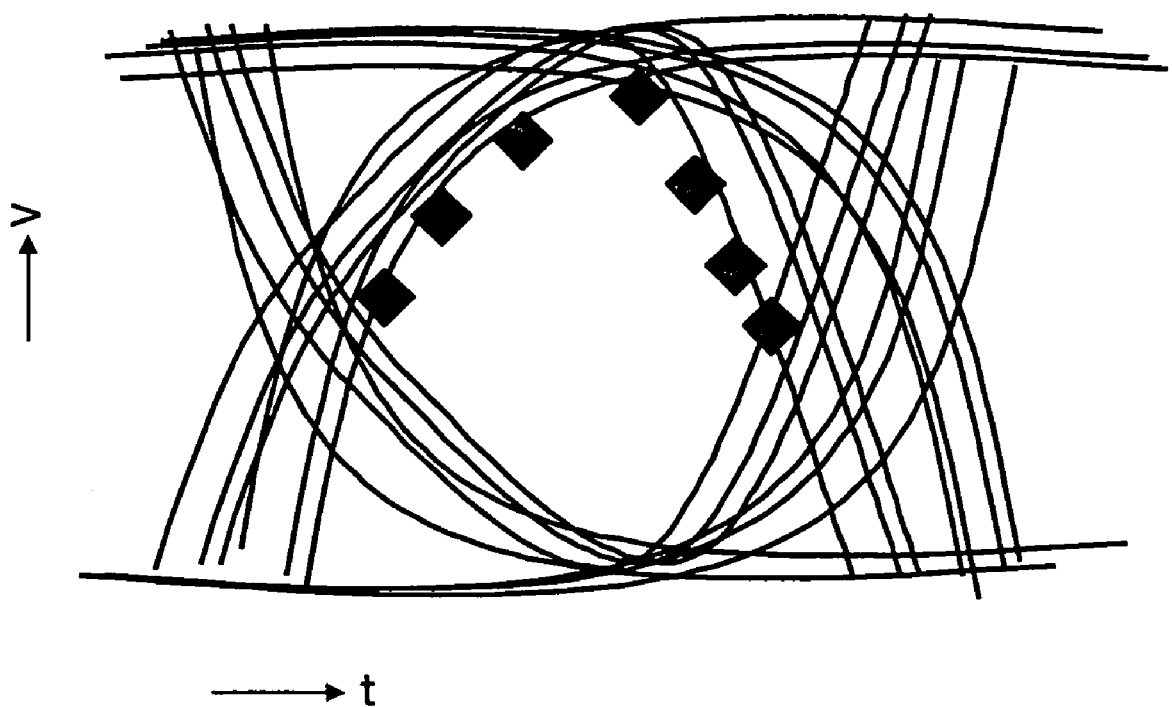
FIG. 25 shows an eye pattern.
Figure 26:
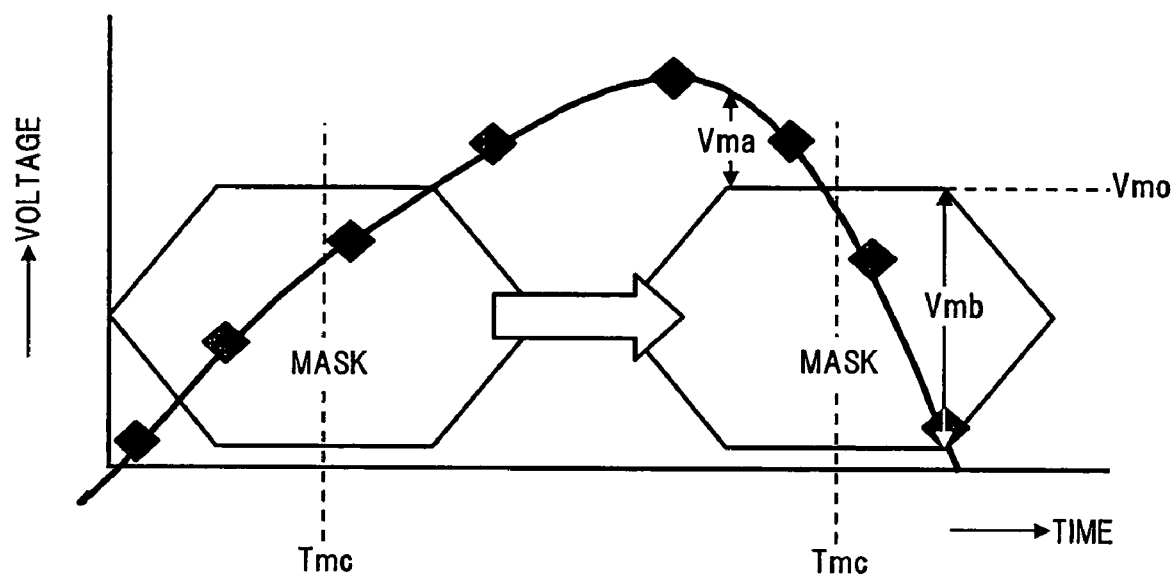
FIG. 26 shows the mask at the receiving end and the waveform margin.
Figure 27:
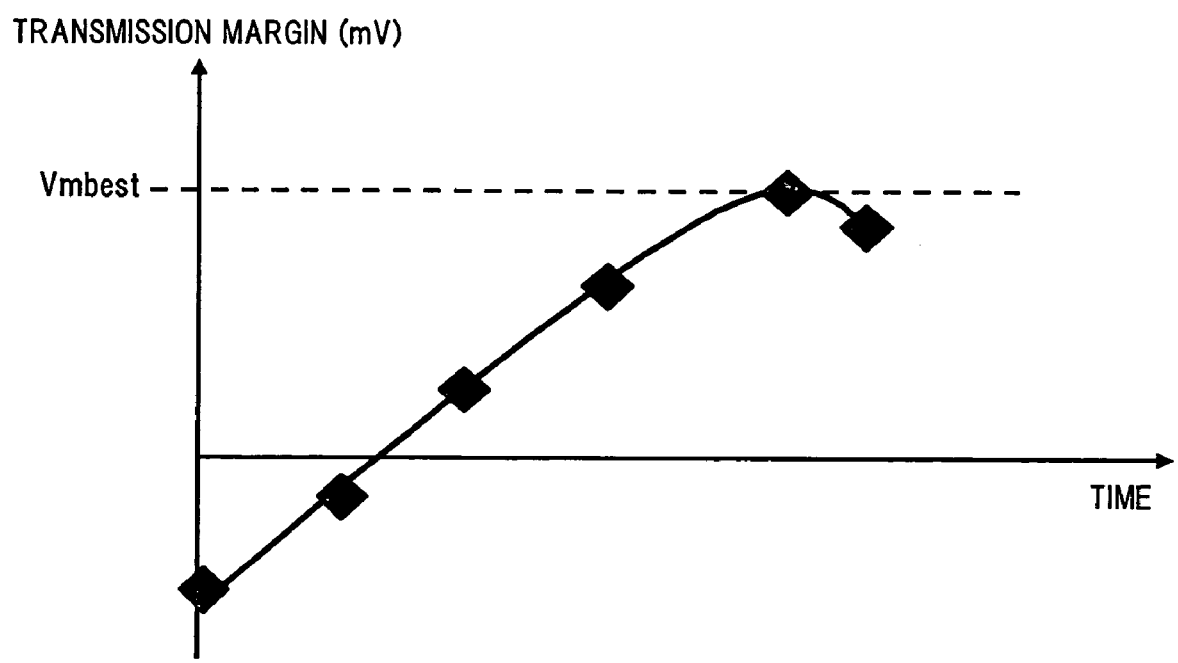
FIG. 27 shows the calculation of an optimal margin from the transmission margin.

Description will be given next of the transmission margin verification apparatus, verification method and verification program thereof according to a third embodiment of the present invention with reference to FIGS. 23 to 27. FIG. 23 shows an example of the process steps of the transmission margin verification method and verification program thereof according to this embodiment. FIG. 24 shows a waveform acquired to verify the transmission margin. FIG. 25 shows an eye pattern formed from the acquired waveform. FIG. 26 shows the calculation of the waveform margin. FIG. 27 shows the transmission margin.

To calculate the transmission margin in this embodiment, as shown in FIG. 23, a waveform is acquired (step S41) first, followed by the creation of an eye pattern (step S42), the creation of an inner plot of the eye pattern (step S43) and the calculation of the transmission margin (step S44).

In the acquisition of a waveform (step S41), a signal pattern having successive zero bits equivalent to the protocol used in the target device 44 is employed to acquire a transmission waveform as shown in FIG. 24 on the oscilloscope 10 from the plurality of the transmission lines 112, 114 and 116 (FIG. 19) having a discrete loss. At this time, the existing averaging function of the oscilloscope 10 is used to eliminate noise in the measurement system. On the other hand, the acquired waveform must have a time length equal to one complete cycle of the repetitive signal pattern.

In the creation of an eye pattern (step S42), the acquired waveform is partitioned into one-bit-wide portions that will be overlaid one above the other to create an eye pattern shown in FIG. 25.

In the creation of an inner plot of the eye pattern (step S43), the minimum values of the upper plots in the eye pattern shown in FIG. 25 are extracted to create an inner plot of the eye pattern.

In the calculation of the transmission margin (step S44), an initial waveform margin Vm0 is calculated. To calculate this initial waveform margin Vm0, the mask center time Tmc is set to ½ of the mask time width first to calculate the initial waveform margin Vm0 in conformity with the aforementioned waveform margin calculation steps (FIG. 16). The margin at this time is assumed to be the waveform margin Vm0. It is to be noted, however, that the margin greater than the mask relative to the waveform margin Vm0 is assumed to be Vma (positive margin) and the margin smaller than the mask is assumed to be Vmb (negative margin) in FIG. 26 showing the waveform margin and the receiving end mask. Then, the waveform is moved in the positive direction along the time axis to calculate the waveform margin, and the waveform margin at the point shifted by a given number of steps is assumed to be a waveform margin Vmn in a given state. Then, in FIG. 27, the mask position is judged to be optimal immediately before the transmission margin value "Vm(n+1)−Vm(n)" turns from positive to negative. The margin at this time is assumed to be an optimal margin Vmbest.

As described above, the edge of a signal having random patterns overlaid one above the other may be used in place of a repetitive waveform to detect the transmission margin. The processes using such a signal ensure optimization of the reflection accuracy and the time axis position of the receiving end mask. While the measurement system noise is not negligible if the overwrite function of the oscilloscope 10 is used to create an eye pattern, the overlaying of averaged waveforms eliminates noise in the measurement system. This ensures correct measurement.

Other embodiments and the features thereof will be listed and described below.

(1) Coordination with Simulator

A transmission line simulation may be executed in coordination with the simulator 19. If the transmission line simulation is used to interpolate measurement data used in the calculation of the actual transmission waveform shown in the first embodiment, the number of measurements can be considerably reduced. This makes it possible to cut down on the cost of creating the test board 20.

Alternatively, as another method, the output waveform of the transmitting device 52 may be simulated in coordination with the simulator 19. The simulator 19 can simulate the output waveform of not only transmission lines but also the transmitting device 52 used in the target device 44 so that complex transmission waveforms can be readily verified such as a pre-emphasized waveform or a waveform containing multi-level codes. Here, pre-emphasis is a process adapted to strengthen a certain frequency component of the signal relative to other components to improve the SN ratio and reduce the distortion, in the signal transmission, as aforementioned. On the other hand, multi-level codes are values other than "0" and "1" (multi-value). The above-described processes on the transmission waveform in coordination with the simulator 19 are less expensive than if the equivalent function is implemented in hardware.

(2) Crosstalk Measurement

As for the crosstalk measurement, using the multi-channel simultaneous output function of the LSI tester 4 practically allows the measurement of the crosstalk noise, i.e., the noise for which only a fixed value (worst-case estimate) has been generally acceptable as an input, in each of the transmission networks. This ensures improved verification accuracy and more elaborate optimization, thus providing the verification results with more transmission margin and expanding the transmission distance in the target device 44.

(3) Eye Pattern Verification Method

As for the eye pattern verification method, the effect of reflection on inter-code interference cannot be observed in the step waveform (repetitive signal with a long period) verification. Although transmitting and measuring a random pattern improves the accuracy, the noise component along the voltage axis of the measuring device considerably affects the measurement accuracy. For this reason, measuring the noise along the voltage axis in the measurement system in advance and subtracting this value from the measurement result eliminates the effect of the noise component along the voltage axis on the measurement accuracy. As for the noise in the measurement system, it suffices to measure the noise at a flat portion of the repetitive signal with a long period. That is, if the measurement is made using a signal having a period long enough for reflection to fit therein, then the pure noise component with no reflection or inter-code interference can be measured. This ensures improved measurement accuracy.

(4) Measurement Method of the Transmission Line Jitter

As for the measurement method of the transmission line jitter, the pre-transmission and post-transmission jitters are generally measured, and the increase in jitter is used as the measured value. One example is the measurement of the transmission line jitter shown in FIG. 9. With this method, the noise along the voltage axis is added as a jitter. However, if the difference in amount of jitter is calculated between the repetitive and random waveforms as a pure amount of jitter along the time axis, the noise along the voltage axis will not be added as a jitter. This allows the effect of the noise along the voltage axis to be avoided.

If the transmission line jitter is measured with overlaid waveforms on the oscilloscope 10, these waveforms include firstly the transmission line jitter to be measured, secondly the jitter of the measuring device and thirdly the deflection along the time axis measured as a jitter due to the noise in the measuring device. Therefore, the second and third jitters must be eliminated. Since the second jitter of the measuring device is constant irrespective of the transmission distance, this jitter can be eliminated by simply subtracting the jitter measured immediately near the output of the measuring device from the measured waveform. However, the third jitter cannot be eliminated by a simple subtraction since the amount of this jitter that is observable as such varies depending on Tr/Tf in the post-transmission waveform. In this regard, however, the jitter in a simple repetitive waveform, i.e., a waveform not containing the transmission line jitter (generally referred to as inter-code interference) to be measured, is measured over the respective transmission distances in the present invention to measure the component to be removed. This component is subtracted from the measured value in the actual data transmission waveform (e.g., PRBS random pattern) to measure the pure transmission jitter. This method ensures improved measurement accuracy.

The transmission line jitter, generally referred to as inter-code interference, can be alternatively measured as the time difference between a. leading edge waveform of the signal with the shortest period and b. leading edge waveform with the longest period (signal) in the signal protocol applied to the target device 44. In general measurement, a PRBS random pattern containing the waveforms "a" and "b" is transmitted over the transmission line, and the overlaid waveforms of this transmission waveform allow the measurement of the jitter value from a histogram measurement. For this reason, the averaging function can be used if each of the waveforms "a" and "b" is measured separately, with the difference between the two waveforms assumed to be the transmission line jitter. This ensures accuracy comparable to that of the above transmission line jitter measurement method. While time is required to obtain an appropriate overlaid waveform in the above transmission line jitter measurement method, using the averaging function reduces the measurement time.

(5) Inclusion of Mismatch at the Receiving End

As for the inclusion of mismatch at the receiving end, variations in each component must be taken into consideration when the apparatus is actually fabricated. One of such variations is a variation in the termination resistor built into the receiving device. This variation leads to a characteristic impedance mismatch in the transmission system, thus deteriorating the transmission waveform and affecting and reducing the transmission margin. As a way of verification of this variation, changing the termination at the side of the LSI tester 4 ensures improved measurement accuracy.

(6) Confirmation of the Leading Edge Waveform for Each Signal Protocol

As for the confirmation of the leading edge waveform for each of the signal protocols, a repetitive waveform having a long period is generally used to acquire a leading edge waveform although the period must be properly long to the extent that the effect of reflection does not manifest itself. The rise time practically varies depending on the signal period. For this reason, after the verification of the shortest and longest periods in the signal protocol applied, the leading edge waveform is acquired for each of the periods. Using the worst-case leading edge waveform as the verification data ensures improved measurement accuracy.

Although the most preferred embodiments of the present invention have been described hereinabove, it is to be appreciated that the present invention is not limited to the above description and that various changes and modifications will naturally occur to those skilled in the art without departing from the spirit and the scope of the invention defined in the appended claims or disclosed herein. Moreover, needless to say, such changes and modifications are encompassed in the scope of the present invention.

The entire disclosure of Japanese Patent Application No. 2004-275098 including specification, claims, drawings and summary are incorporated herein by reference in its entirety.

What is claimed is:

1. A transmission margin verification apparatus, comprising:
    a measurement unit configured to measure a transmission line loss and a time-base waveform of pseudo transmission lines corresponding to a target device to be verified; and
    a calculation unit configured to reference the transmission line loss and the time-base waveform measured by the measurement unit, the calculation unit calculating a transmission waveform of the target device and associating the transmission waveform with a mask of the target device to calculate a transmission margin of the target device, wherein the transmission margin is calculated by use of an eye pattern waveform.

2. The transmission margin verification apparatus of claim 1, wherein the measurement unit is arranged to measure the transmission line loss and the time-base waveform of the pseudo transmission lines calculated with a simulator.

3. The transmission margin verification apparatus of claim 1, wherein the measurement unit is arranged to cooperate with a simulator to acquire a time-base waveform of a pre-emphasized transmission waveform or of a transmission waveform containing multi-level codes.

4. The transmission margin verification apparatus of claim 1, wherein the measurement unit is arranged to measure the crosstalk of a plurality of transmission systems included in the target device.

5. The transmission margin verification apparatus of claim 1, wherein the transmission margin is calculated by adjusting a location of the mask with respect to the eye pattern waveform.

6. A transmission margin verification method, comprising:
    acquiring a transmission line loss and a time-base waveform of pseudo transmission lines corresponding to a target device to be verified;
    referencing the transmission line loss and the time-base waveform to calculate a transmission waveform of the target device; and
    associating the transmission waveform with a mask of the target device to calculate a transmission margin of the target device, wherein the transmission margin is calculated by use of an eye pattern waveform and at least one of the acquiring, referencing and associating are controlled by a controller.

7. The transmission margin verification method of claim 6, further comprising measuring noises of a measuring device at a flat portion of a repetitive pattern with a long period, wherein the transmission margin is calculated by use of an eye pattern obtained by removing the measuring device noises.

8. The transmission margin verification method of claim 6, further comprising:
  measuring a jitter in a repetitive waveform; and
  removing the jitter in the repetitive waveform from a jitter in a random pattern to obtain a transmission line jitter.

9. The transmission margin verification method of claim 6, further comprising:
  finding shortest and longest periods of a signal protocol applied to the target device;
  acquiring time-base waveforms of repetitive signals with the longest and the shortest periods; and
  calculating as a transmission line jitter the difference between the time-base waveform of the repetitive signal with the shortest period and the time-base waveform of the repetitive signal with the longest period.

10. The transmission margin verification method of claim 6, further comprising varying a termination resistance at the measuring device to measure a mismatch at the receiving end.

11. The transmission margin verification method of claim 6, further comprising:
  acquiring time-bases of transmission waveforms with the shortest and the longest periods of the protocol applied to the target device; and
  verifying the worst case from the time-bases of the transmission waveforms.

12. The transmission margin verification method of claim 6, wherein the transmission margin is calculated by adjusting a location of the mask with respect to the eye pattern waveform.

13. A computer-readable medium storing a transmission margin verification program, which when executed by a computer causes the computer to execute:
  acquiring data representative of a transmission line loss and a time-base waveform of pseudo transmission lines corresponding to a target device to be verified;
  referencing the transmission line loss and the time-base waveform to calculate a transmission waveform of the target device; and
  associating the transmission waveform with a mask of the target device to calculate a transmission margin of the target device, wherein the transmission margin is calculated by use of an eye pattern waveform.

14. The computer-readable medium according to claim 13, wherein the computer further executes:
  obtaining noises of a measuring device at a flat portion of a repetitive pattern with a long period; and
  calculating the transmission margin by use of an eye pattern obtained by removing the measuring device noises.

15. The computer-readable medium according to claim 13, wherein the computer further executes:
  obtaining a jitter in a repetitive waveform; and
  removing the jitter in the repetitive waveform from a jitter in a random pattern to obtain a transmission line jitter.

16. The computer-readable medium according to claim 13, wherein the computer further executes:
  finding shortest and longest periods of a signal protocol applied to the target device;
  acquiring data representative of time-base waveforms of repetitive signals with the longest and shortest periods; and
  calculating as a transmission line jitter the difference between the time-base waveform of the repetitive signal with the shortest period and the time-base waveform of the repetitive signal with the longest period.

17. The computer-readable medium according to claim 13, wherein the computer further executes varying a termination resistance at the measuring device to measure a mismatch at the receiving end.

18. The computer-readable medium according to claim 13, wherein the computer further executes:
  acquiring data representative of time-base transmission waveforms with the shortest and longest periods of the protocol applied to the target device; and
  verifying the worst case from the time-base transmission waveforms.

19. The computer-readable medium according to claim 13, wherein the transmission margin is calculated by adjusting a location of the mask with respect to the eye pattern waveform.

* * * * *